US012039351B2

(12) United States Patent
Timmons et al.

(10) Patent No.: US 12,039,351 B2
(45) Date of Patent: Jul. 16, 2024

(54) MACHINE LEARNING FOR TARGETING HELP CONTENT

(71) Applicant: Salesforce, Inc., San Francisco, CA (US)

(72) Inventors: Andrew Timmons, Emeryville, CA (US); Fiona Condon, Brooklyn, NY (US); Joel Bartlett, Manhattan, NY (US); Elijah Joseph-Young, Oakville (CA); Jason Kranker, Medfield, MA (US); Mihailo Milic, Mississauga (CA); Shreya Mohan Shetty, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/071,350

(22) Filed: Nov. 29, 2022

(65) Prior Publication Data

US 2024/0176630 A1    May 30, 2024

(51) Int. Cl.
*G06F 9/451* (2018.01)

(52) U.S. Cl.
CPC .................................. *G06F 9/453* (2018.02)

(58) Field of Classification Search
CPC ..................................................... G06F 3/0482
See application file for complete search history.

(56) References Cited

U.S. PATENT DOCUMENTS

| 8,892,446 | B2* | 11/2014 | Cheyer | G10L 21/06 |
| | | | | 704/251 |
| 10,698,706 | B1* | 6/2020 | Rabe | G06F 3/0484 |
| 10,728,781 | B2 | 7/2020 | Timmons et al. | |
| 10,768,952 | B1* | 9/2020 | Watson | G06F 16/972 |
| 11,343,253 | B2 | 5/2022 | Timmons et al. | |
| 11,425,584 | B2 | 8/2022 | Timmons et al. | |
| 2009/0125796 | A1* | 5/2009 | Day | G06F 9/451 |
| | | | | 715/764 |
| 2013/0154958 | A1* | 6/2013 | Clavin | G06F 1/1632 |
| | | | | 345/173 |
| 2015/0264023 | A1* | 9/2015 | Reno | H04L 63/08 |
| | | | | 726/7 |
| 2019/0232168 | A1* | 8/2019 | Benedetto | A63F 13/5375 |
| 2020/0351566 | A1* | 11/2020 | Yelton | H04N 21/8456 |
| 2020/0410583 | A1* | 12/2020 | Hart | G06Q 20/405 |
| 2021/0118325 | A1* | 4/2021 | Gupta | G09B 19/00 |
| 2021/0149688 | A1 | 5/2021 | Newell et al. | |
| 2021/0182087 | A1* | 6/2021 | Park | G06F 3/0481 |
| 2021/0365806 | A1* | 11/2021 | Sumanth | G06N 20/00 |
| 2022/0147197 | A1 | 5/2022 | Tross et al. | |
| 2022/0278989 | A1 | 9/2022 | Timmons et al. | |

OTHER PUBLICATIONS

PCT Patent Application PCT/US2023/021928 International Search Report and Written Opinion of the International Searching Authority issued Aug. 30, 2023.

* cited by examiner

*Primary Examiner* — Di Xiao
(74) *Attorney, Agent, or Firm* — Lee & Hayes, P.C.

(57) ABSTRACT

Media, methods, and systems of recommending personalized help content within a group-based communication system. A machine learning model trained with prior user interaction data and historical user engagement data is used to generate a list of recommended help content based at least in part on received user interaction data for a user.

20 Claims, 14 Drawing Sheets

FIG. 2B

| User | Messages Sent | Reactions | Channels Joined | Messages Per Day | Score |
|---|---|---|---|---|---|
| J. Smith | 221 | 250 | 14 | 12 | 92 |
| C. Simon | 168 | 117 | 10 | 9 | 84 |
| B. Goodman | 22 | 10 | 2 | 2 | 21 |

FIG. 7

MACHINE LEARNING FOR TARGETING HELP CONTENT

TECHNICAL FIELD

Embodiments of the present disclosure generally relate to using machine learning for personalizing technical help content. More specifically, embodiments of the present disclosure relate to curating and presenting personalized help content of a group-based communication system using a trained machine learning model.

BACKGROUND

Help content for a group-based communication system exists in a variety of forms such as articles, videos, and audio. However, there is not a means to automatically curate and personalize this help content for users of the group-based communication system. Accordingly, the help content may not be easily accessible or even known to users and thus, fails to increase user knowledge of technical features within the group-based communication system.

BRIEF DESCRIPTION OF THE FIGURES

Embodiments of the present disclosure are described in detail below with reference to the attached drawing figures, wherein:

FIG. 2B illustrates a user interface for synchronous multimedia collaboration sessions within the group-based communication system for certain embodiments;

FIG. 7 illustrates an exemplary user data table relating to some embodiments;

Figure 1:
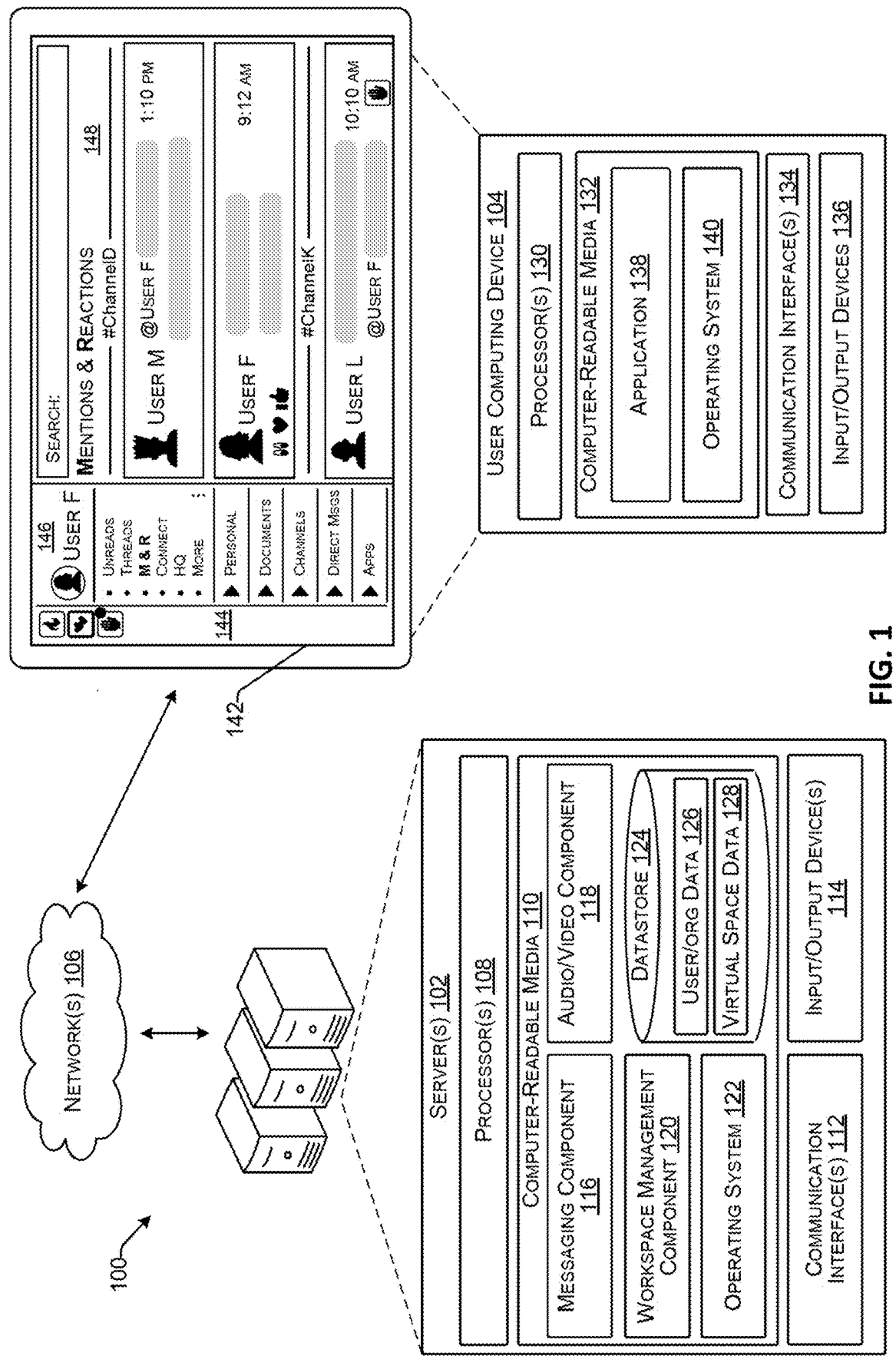
FIG. 1 illustrates an exemplary environment for certain embodiments.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description of embodiments of the present disclosure references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized, and changes can be made without departing from the scope of the present disclosure. The following detailed description is, therefore, not to be taken in a limiting sense. The scope of embodiments of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Group-Based Communication System

FIG. 1 illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, communication channels, messages, collaborative documents, canvases, audio/video conversations, and/or other virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with the same organization. In some examples, members of a group, and thus workspace, can be associated with different organizations (e.g., entities with different organization identifiers).

In at least one example, the example environment 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, and/or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102, such as performing the methods described below. Functional components stored in the computer-readable media can optionally include a messaging component 116, an audio/video component 118, a workspace management component 120, an operating system 122, and a datastore 124.

In at least one example, the messaging component 116 can process messages between users. That is, in at least one example, the messaging component 116 can receive an outgoing message from a user computing device 104 and can send the message as an incoming message to a second user computing device 104. The messages can include direct messages sent from an originating user to one or more specified users and/or communication channel messages sent via a communication channel from the originating user to the one or more users associated with the communication channel. Additionally, the messages can be transmitted in association with a collaborative document, canvas, or other collaborative space. In at least one example, the canvas can include a flexible canvas for curating, organizing, and sharing collections of information between users. In at least one example, the collaborative document can be associated with a document identifier (e.g., virtual space identifier, communication channel identifier, etc.) configured to enable messaging functionalities attributable to a virtual space (e.g., a communication channel) within the collaborative document. That is, the collaborative document can be treated as, and include the functionalities associated with, a virtual space, such as a communication channel. The virtual space, or communication channel, can be a data route used for exchanging data between and among systems and devices associated with the communication platform.

In at least one example, the messaging component 116 can establish a communication route between and among various user computing devices, allowing the user computing devices to communicate and share data between and among each other. In at least one example, the messaging component 116 can manage such communications and/or sharing of data. In some examples, data associated with a virtual space, such a collaborative document, can be presented via a user interface. In addition, metadata associated with each message transmitted via the virtual space, such as a timestamp associated with the message, a sending user identifier, a recipient user identifier, a conversation identifier and/or a root object identifier (e.g., conversation associated with a thread and/or a root object), and/or the like, can be stored in association with the virtual space.

In various examples, the messaging component 116 can receive a message transmitted in association with a virtual space (e.g., direct message instance, communication channel, canvas, collaborative document, etc.). In various examples, the messaging component 116 can identify one or more users associated with the virtual space and can cause a rendering of the message in association with instances of the virtual space on respective user computing devices 104. In various examples, the messaging component 116 can identify the message as an update to the virtual space and, based on the identified update, can cause a notification associated with the update to be presented in association with a sidebar of the user interface associated with one or more of the users associated with the virtual space. For example, the messaging component 116 can receive, from a first user account, a message transmitted in association with a virtual space. In response to receiving the message (e.g., interaction data associated with an interaction of a first user with the virtual space), the messaging component 116 can identify a second user associated with the virtual space (e.g., another user that is a member of the virtual space). In some examples, the messaging component 116 can cause a notification of an update to the virtual space to be presented via a sidebar of a user interface associated with a second user account of the second user. In some examples, the messaging component 116 can cause the notification to be presented in response to a determination that the sidebar of the user interface associated with the second user account includes an affordance associated with the virtual space. In such examples, the notification can be presented in association with the affordance associated with the virtual space.

In various examples, the messaging component 116 can be configured to identify a mention or tag associated with the message transmitted in association with the virtual space. In at least one example, the mention or tag can include an @mention (or other special character) of a user identifier that is associated with the communication platform. The user identifier can include a username, real name, or other unique identifier that is associated with a particular user. In response to identifying the mention or tag of the user identifier, the messaging component 116 can cause a notification to be presented on a user interface associated with the user identifier, such as in association with an affordance associated with the virtual space in a sidebar of a user interface associated with the particular user and/or in a virtual space associated with mentions and reactions. That is, the messaging component 116 can be configured to alert a particular user that they were mentioned in a virtual space.

In at least one example, the audio/video component 118 can be configured to manage audio and/or video communications between and among users. In some examples, the audio and/or video communications can be associated with an audio and/or video conversation. In at least one example, the audio and/or video conversation can include a discrete identifier configured to uniquely identify the audio and/or video conversation. In some examples, the audio and/or video component 118 can store user identifiers associated with user accounts of members of a particular audio and/or video conversation, such as to identify user(s) with appropriate permissions to access the particular audio and/or video conversation.

In some examples, communications associated with an audio and/or video conversation ("conversation") can be synchronous and/or asynchronous. That is, the conversation can include a real-time audio and/or video conversation between a first user and a second user during a period of time and, after the first period of time, a third user who is associated with (e.g., is a member of) the conversation can contribute to the conversation. The audio/video component 118 can be configured to store audio and/or video data associated with the conversation, such as to enable users with appropriate permissions to listen and/or view the audio and/or video data.

In some examples, the audio/video component 118 can be configured to generate a transcript of the conversation and can store the transcript in association with the audio and/or video data. The transcript can include a textual representation of the audio and/or video data. In at least one example, the audio/video component 118 can use known speech recognition techniques to generate the transcript. In some examples, the audio/video component 118 can generate the transcript concurrently or substantially concurrently with the conversation. That is, in some examples, the audio/video component 118 can be configured to generate a textual representation of the conversation while it is being conducted. In some examples, the audio/video component 118 can generate the transcript after receiving an indication that the conversation is complete. The indication that the conversation is complete can include an indication that a host or administrator associated therewith has stopped the conversation, that a threshold number of meeting attendees have closed associated interfaces, and/or the like. That is, the audio/video component 118 can identify a completion of the conversation and, based on the completion, can generate the transcript associated therewith.

In at least one example, the audio/video component 118 can be configured to cause presentation of the transcript in association with a virtual space with which the audio and/or video conversation is associated. For example, a first user can initiate an audio and/or video conversation in association with a communication channel. The audio/video component 118 can process audio and/or video data between attendees of the audio and/or video conversation and can generate a transcript of the audio and/or video data. In response to generating the transcript, the audio/video component 118 can cause the transcript to be published or otherwise presented via the communication channel. In at least one example, the audio/video component 118 can render one or more sections of the transcript selectable for commenting, such as to enable members of the communication channel to comment on, or further contribute to, the conversation. In some examples, the audio/video component 118 can update the transcript based on the comments.

In at least one example, the audio/video component 118 can manage one or more audio and/or video conversations in association with a virtual space associated with a group (e.g., organization, team, etc.) administrative or command center. The group administrative or command center can be referred to herein as a virtual (and/or digital) headquarters associated with the group. In at least one example, the audio/video component 118 can be configured to coordinate with the messaging component 116 and/or other components of the server(s) 102, to transmit communications in association with other virtual spaces that are associated with the virtual headquarters. That is, the messaging component 116 can transmit data (e.g., messages, images, drawings, files, etc.) associated with one or more communication channels, direct messaging instances, collaborative documents, canvases, and/or the like, that are associated with the virtual headquarters. In some examples, the communication channel(s), direct messaging instance(s), collaborative document(s), canvas(es), and/or the like can have associated therewith one or more audio and/or video conversations managed by the audio/video component 118. That is, the audio and/or video conversations associated with the virtual headquarters can be further associated with, or independent of, one or more other virtual spaces of the virtual headquarters.

In at least one example, the workspace management component 120 can manage workspaces. That is, in at least one example, the communication platform can be partitioned into different workspaces, which can be associated with different groups of users, as described above. As described above, each workspace can be associated with a group identifier and one or more user accounts can be mapped to, or otherwise associated with, the group identifier. User(s) corresponding to such user account(s) can be "members" of the group.

In some examples, the workspace management component 120 can manage workspace membership. That is, the workspace management component 120 can receive requests to associate users with individual workspaces and the workspace management component 120 can associate user accounts associated with such users with group identifiers associated with the individual workspaces. For example, responsive to receiving a request to add a user to a workspace, the workspace management component 120 can associate a user account of the user with a group identifier of the workspace. The workspace management component 120 can disassociate user accounts and group identifiers, for example, when a user is removed from a workspace.

In at least one example, the workspace management component 120 can manage cross-workspace data integration, as described herein. For example, the workspace management component 120 can detect updates to data associated with a workspace and can integrate such updated data into user interface(s) presented via user computing device(s) of user(s) associated with the workspace. Such data integration can be "cross-workspace" such that, regardless of which workspace a user is logged in to, the user can receive updated data associated with each of the workspaces of which he or she is a member and/or access data associated with each of the workspaces of which he or she is a member (pending permissions, as described below). That is, the workspace management component 120 can detect updates to data associated with a workspace and can integrate such updated data into user interface(s) presented via user computing device(s) of user(s) associated with the workspace. Similarly, the workspace management component 120 can facilitate cross-workspace operations. For example, the workspace management component 120 can facilitate messages between workspaces, searches between or across multiple workspaces, and the like. Additional details of operations that can be performed by the workspace management component 120 are described below.

In at least one example, the operating system 122 can manage the processor(s) 108, computer-readable media 110, hardware, software, etc. of the server(s) 102.

In at least one example, the datastore 124 can be configured to store data that is accessible, manageable, and updatable. In some examples, the datastore 124 can be integrated with the server(s) 102, as shown in FIG. 1. In other examples, the datastore 124 can be located remotely from the server(s) 102 and can be accessible to the server(s) 102 and/or user device(s), such as the user device 104. The datastore 124 can comprise multiple databases, which can include user/org data 126 and/or virtual space data 128. Additional or alternative data may be stored in the data store and/or one or more other data stores.

In at least one example, the user/org data 126 can include data associated with users of the communication platform. In at least one example, the user/org data 126 can store data in user profiles (which can also be referred to as "user accounts"), which can store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In at least one example, the user/org data 126 can include permission data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. Permissions associated with an individual user can be mapped to, or otherwise associated with, an account or profile within the user/org data 126. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In at least one example, the user/org data 126 can include data associated with one or more organizations of the communication platform. In at least one example, the user/org data 126 can store data in organization profiles, which can store data associated with an organization, including, but not limited to, one or more user identifiers associated with the organization, one or more virtual space identifiers associated with the organization (e.g., workspace identifiers, communication channel identifiers, direct message instance identifiers, collaborative document identifiers, canvas identifiers, audio/video conversation identifiers, etc.), an organization identifier associated with the organization, one or more organization identifiers associated with other organizations that are authorized for communication with the organization, and the like.

In at least one example, the virtual space data 128 can include data associated with one or more virtual spaces associated with the communication platform. The virtual space data 128 can include textual data, audio data, video data, images, files, and/or any other type of data configured to be transmitted in association with a virtual space. Non-limiting examples of virtual spaces include workspaces, communication channels, direct messaging instances, collaborative documents, canvases, and audio and/or video conversations. In at least one example, the virtual space data can store data associated with individual virtual spaces separately, such as based on a discrete identifier associated with each virtual space. In some examples, a first virtual space can be associated with a second virtual space. In such examples, first virtual space data associated with the first virtual space can be stored in association with the second virtual space. For example, data associated with a collaborative document that is generated in association with a communication channel may be stored in association with the communication channel. For another example, data associated with an audio and/or video conversation that is conducted in association with a communication channel can be stored in association with the communication channel.

As discussed above, each virtual space of the communication platform can be assigned a discrete identifier that uniquely identifies the virtual space. In some examples, the virtual space identifier associated with the virtual space can include a physical address in the virtual space data 128 where data related to that virtual space is stored. A virtual space may be "public," which may allow any user within an organization (e.g., associated with an organization identifier) to join and participate in the data sharing through the virtual space, or a virtual space may be "private," which may restrict data communications in the virtual space to certain users or users having appropriate permissions to view. In some examples, a virtual space may be "shared," which may allow users associated with different organizations (e.g., entities associated with different organization identifiers) to join and participate in the data sharing through the virtual space. Shared virtual spaces (e.g., shared channels) may be public such that they are accessible to any user of either organization, or they may be private such that they are restricted to access by certain users (e.g., users with appropriate permissions) of both organizations.

In some examples, the datastore 124 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 124 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared virtual space).

In some examples, individual groups can be associated with a database shard within the datastore 124 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a virtual space can be associated with a database shard within the datastore 124 that stores data related to a particular virtual space identification. For example, a database shard may store electronic communication data associated with the virtual space, which enables members of that particular virtual space to communicate and exchange data with other members of the same virtual space in real time or near-real time. As discussed above, the communications via the virtual space can be synchronous and/or asynchronous. In at least one example, a group or organization can be the owner of the database shard and can control where and how the related data is stored.

In some examples, individual users can be associated with a database shard within the datastore 124 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Websockets, Application Programming Interfaces (APIs) (e.g., using API calls), Hypertext Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 130, computer-readable media 132, one or more communication interfaces 134, and input/output devices 136.

In at least one example, each processor of the processor(s) 130 can be a single processing unit or multiple processing units and can include single or multiple computing units or multiple processing cores. The processor(s) 130 can comprise any of the types of processors described above with reference to the processor(s) 108 and may be the same as or different than the processor(s) 108.

The computer-readable media 132 can comprise any of the types of computer-readable media 132 described above with reference to the computer-readable media 110 and may be the same as or different than the computer-readable media 110. Functional components stored in the computer-readable media can optionally include at least one application 138 and an operating system 140.

In at least one example, the application 138 can be a mobile application, a web application, or a desktop application, which can be provided by the communication platform, or which can be an otherwise dedicated application. In some examples, individual user computing devices associated with the environment 100 can have an instance or versioned instance of the application 138, which can be downloaded from an application store, accessible via the Internet, or otherwise executable by the processor(s) 130 to perform operations as described herein. That is, the application 138 can be an access point, enabling the user computing device 104 to interact with the server(s) 102 to access and/or use communication services available via the communication platform. In at least one example, the application 138 can facilitate the exchange of data between and among various other user computing devices, for example via the server(s) 102. In at least one example, the application 138 can present user interfaces, as described herein. In at least one example, a user can interact with the user interfaces via touch input, keyboard input, mouse input, spoken input, or any other type of input.

A non-limiting example of a user interface 142 is shown in FIG. 1. As illustrated in FIG. 1, the user interface 142 can present data associated with one or more virtual spaces, which may include one or more workspaces. That is, in some examples, the user interface 142 can integrate data from multiple workspaces into a single user interface so that the user (e.g., of the user computing device 104) can access and/or interact with data associated with the multiple workspaces that he or she is associated with and/or otherwise communicate with other users associated with the multiple workspaces. In some examples, the user interface 142 can include a first region 144, or pane, that includes indicator(s) (e.g., user interface element(s) or object(s)) associated with workspace(s) with which the user (e.g., account of the user) is associated. In some examples, the user interface 142 can include a second region 146, or pane, that includes indicator(s) (e.g., user interface element(s), affordance(s), object(s), etc.) representing data associated with the workspace(s) with which the user (e.g., account of the user) is associated. In at least one example, the second region 146 can represent a sidebar of the user interface 142. Additional details associated with the second region 146 and indicator(s) are described below.

In at least one example, the user interface 142 can include a third region 148, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 148 can be associated with the same or different workspaces. That is, in some examples, the third region 148 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 148 presents data associated with multiple workspaces, at least some data can be associated with an indication of which workspace the data is associated with.

In at least one example, the operating system 140 can manage the processor(s) 130, computer-readable media 132, hardware, software, etc. of the server(s) 102.

The communication interface(s) 134 can include one or more interfaces and hardware components for enabling communication with various other devices (e.g., the user computing device 104), such as over the network(s) 106 or directly. In some examples, the communication interface(s) 134 can facilitate communication via Websockets, APIs (e.g., using API calls), HTTPs, etc.

The user computing device 104 can further be equipped with various input/output devices 136 (e.g., I/O devices). Such I/O devices 136 can include a display, various user interface controls (e.g., buttons, joystick, keyboard, mouse, touch screen, etc.), audio speakers, connection ports and so forth.

While techniques described herein are described as being performed by the messaging component 116, the audio/video component 118, the workspace management component 120, and the application 138, techniques described herein can be performed by any other component, or combination of components, which can be associated with the server(s) 102, the user computing device 104, or a combination thereof.

User Interface for a Group-Based Communication System

Figure 2A:
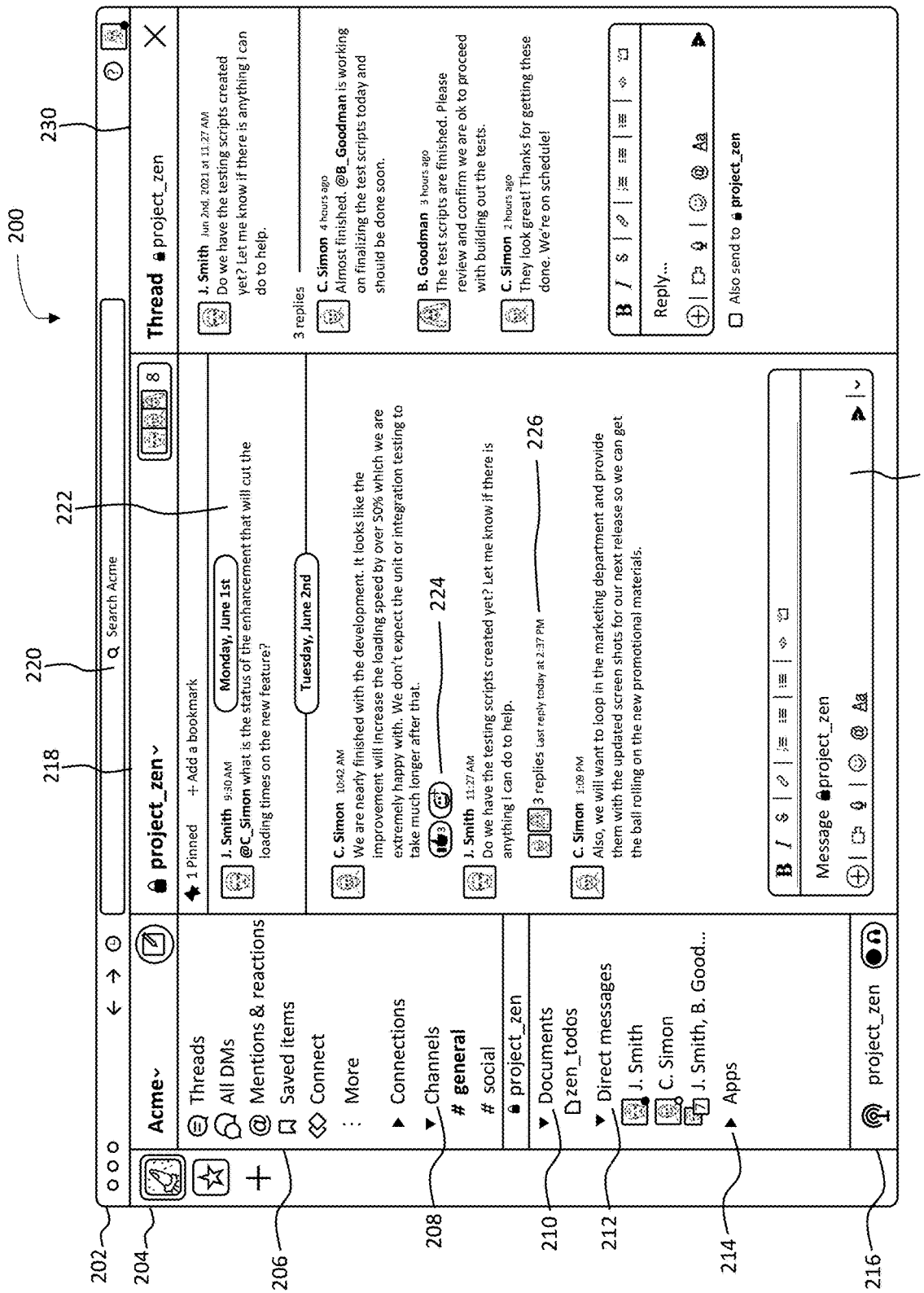
FIG. 2A illustrates a user interface for a group-based communication system for certain embodiments.

FIG. 2A illustrates a user interface 200 of a group-based communication system, which will be useful in illustrating the operation of various embodiments, as discussed in further detail below. The group-based communication system may include communication data such as messages, queries, files, mentions, users or user profiles, interactions, tickets, channels, applications integrated into one or more channels, conversations, workspaces, or other data generated by or shared between users of the group-based communication system. In some instances, the communication data may comprise data associated with a user, such as a user identifier, channels to which the user has been granted access, groups with which the user is associated, permissions, and other user-specific information.

User interface 200 comprises a plurality of objects such as panes, text entry fields, buttons, messages, or other user interface components that are viewable by a user of the group-based communication system. As depicted, user interface 200 comprises title bar 202, workspace pane 204, navigation pane 206, synchronous multimedia collaboration session pane 216, channel pane 218, and thread pane 230.

In some embodiments, title bar 202 comprises search bar 220. Search bar 220 may allow users to search for content located in the current workspace of the group-based communication system, such as files, messages, channels, members, commands, functions, and the like. Users may refine their searches by attributes such as content type, content author, and by users associated with the content. Users may optionally search within specific workspaces, channels, direct message conversations, or documents. In some embodiments, title bar 202 comprises navigation commands allowing a user to move backwards and forwards between different panes, as well as to view a history of accessed content. Title bar 202 may comprise additional resources such as links to help documents and user configuration settings.

In some embodiments, the group-based communication system can comprise a plurality of distinct workspaces, where each workspace is associated with different groups of users and channels. Each workspace can be associated with a group identifier and one or more user identifiers can be mapped to, or otherwise associated with, the group identifier. Users corresponding to such user identifiers may be referred to as members of the group. In some embodiments, user interface 200 comprises workspace pane 204 for navigating between, adding, or deleting various workspaces in the group-based communication system. For example, a user may be a part of a workspace for Acme, where the user is an employee of or otherwise affiliated with Acme. The user may also be a member of a local volunteer organization that also uses the group-based communication system to collaborate. To navigate between the two groups, the user may use workspace pane 204 to change from the Acme workspace to the volunteer organization workspace. A workspace may comprise one or more channels that are unique to that workspace and/or one or more channels that are shared between one or more workspaces. For example, the Acme company may have a workspace for Acme projects, such as Project Zen, a workspace for social discussions, and an additional workspace for general company matters. In some embodiments, an organization, such as a particular company, may have a plurality of workspaces, and the user may be associated with one or more workspaces belonging to the organization. In yet other embodiments, a particular workspace can be associated with one or more organizations or other entities associated with the group-based communication system.

In some embodiments, navigation pane 206 permits users to navigate between virtual spaces such as pages, channels 208, collaborative documents 210 (such as those discussed at FIG. 2D), applications 214, and direct messages 212 within the group-based communication system. For example, navigation pane 206 can include indicators representing virtual spaces that can aggregate data associated with a plurality of virtual spaces of which the user is a member. In at least one example, each virtual space can be associated with an indicator in navigation pane 206. In some examples, an indicator can be associated with an actuation mechanism (e.g., affordance) such that when actuated, can cause user interface 200 to present data associated with the corresponding virtual space. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented, for example in a feed. In such examples, different types of events and/or actions, which can be associated with different virtual spaces, can be presented via the same feed. In some examples, such data can be organized and/or is sortable by associated virtual space (e.g., virtual space via which the communication was transmitted), time, type of action, user, and/or the like. In some examples, such data can be associated with an indication of which user (e.g., member of the associated virtual space) posted the message and/or performed an action.

In some examples, a virtual space can be associated with the same type of event and/or action. For example, "threads" can be associated with messages, files, etc. posted in threads to messages posted in a virtual space and "mentions and reactions" can be associated with messages or threads where the user has been mentioned (e.g., via a tag) or another user has reacted (e.g., via an emoji, reaction, or the like) to a message or thread posted by the user. That is, in some examples, the same types of events and/or actions, which can be associated with different virtual spaces, can be presented via the same feed. As with the "unreads" virtual space, data associated with such virtual spaces can be organized and/or is sortable by virtual space, time, type of action, user, and/or the like.

In some examples, a virtual space can be associated with facilitating communications between a user and other users of the communication platform. For example, "connect" can be associated with enabling the user to generate invitations to communicate with one or more other users. In at least one example, responsive to receiving an indication of selection of the "connect" indicator, the communication platform can cause a connections interface to be presented.

In some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

In some examples, a virtual space can be associated with a group (e.g., organization, team, etc.) headquarters (e.g., administrative or command center). In at least one example, the group headquarters can include a virtual or digital headquarters for administrative or command functions associated with a group of users. For example, "HQ" can be associated with an interface including a list of indicators associated with virtual spaces configured to enable associated members to communicate. In at least one example, the user can associate one or more virtual spaces with the "HQ" virtual space, such as via a drag and drop operation. That is, the user can determine relevant virtual space(s) to associate with the virtual or digital headquarters, such as to associate virtual space(s) that are important to the user therewith.

Though not illustrated, in some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

Additionally, though not illustrated, in some examples, a virtual space can be associated with one or more canvases with which the user is associated. In at least one example, the canvas can include a flexible canvas for curating, organizing, and sharing collections of information between users. That is, the canvas can be configured to be accessed and/or modified by two or more users with appropriate permissions. In at least one example, the canvas can be configured to enable sharing of text, images, videos, GIFs, drawings (e.g., user-generated drawing via a canvas interface), gaming content (e.g., users manipulating gaming controls synchronously or asynchronously), and/or the like. In at least one example, modifications to a canvas can include adding, deleting, and/or modifying previously shared (e.g., transmitted, presented) data. In some examples, content associated with a canvas can be shareable via another virtual space, such that data associated with the canvas is accessible to and/or rendered interactable for members of the virtual space.

Navigation pane 206 may further comprise indicators representing communication channels. In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces or, alternatively, may only be associated with one of the workspaces. In some examples, the communication channels represented can be associated with combinations of communication channels associated with a single workspace and communication channels associated with different workspaces.

In some embodiments, navigation pane 206 may depict all communication channels, or a subset of all communication channels, that the user has permission to access (e.g., as determined by the permission data). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, navigation pane 206 can depict all communication channels, or a subset of all communication channels, that the user is a member of, and the user can interact with user interface 200 to browse or view other communication channels that the user is not a member of but are not currently displayed in navigation pane 206. In some examples, different types of communication channels (e.g., public, private, shared, cross-workspace, etc.) can be in different sections of navigation pane 206, or can have their own sub-regions or sub-panes in the user interface 200. In some examples, communication channels associated with different workspaces can be in different sections of navigation pane 206 or can have their own regions or panes in user interface 200.

In some examples, the indicators can be associated with graphical elements that visually differentiate types of communication channels. For example, project_zen is associated with a lock graphical element. As a non-limiting example, and for the purpose of this discussion, the lock graphical element can indicate that the associated communication channel, project_zen, is private and access thereto is limited, whereas another communication channel, general, is public and access thereto is available to any member of an organization with which the user is associated. In some examples, additional or alternative graphical elements can be used to differentiate between shared communication channels, communication channels associated with different workspaces, communication channels with which the user is or is not a current member, and/or the like.

In at least one example, navigation pane 206 can include indicators representative of communications with individual users or multiple specified users (e.g., instead of all, or a subset of, members of an organization). Such communications can be referred to as "direct messages." Navigation pane 206 can include indicators representative of virtual spaces that are associated with private messages between one or more users.

Direct messages 212 may be communications between a first user and a second user, or they may be multi-person direct messages between a first user and two or more second users. Navigation pane 206 may be sorted and organized into hierarchies or sections depending on the user's preferences. In some embodiments, all of the channels to which a user has been granted access may appear in navigation pane 206. In other embodiments, the user may choose to hide certain channels or collapse sections containing certain channels. Items in navigation pane 206 may indicate when a new message or update has been received or is currently unread, such as by bolding the text associated with a channel in which an unread message is located or adding an icon or badge (for example, with a count of unread messages) to the channel name. In some embodiments, the group-based communication system may additionally or alternatively store permissions data associated with permissions of individual users of the group-based communication system, indicating which channels a user may view or join. Permissions can indicate, for example, which users can communicate directly with other users, which channels a user is permitted to access, restrictions on individual channels, which workspaces the user is permitted to access, and restrictions on individual workspaces.

Additionally, though not illustrated, navigation pane 206 can include a sub-section that is a personalized sub-section associated with a team of which the user is a member. That is, the "team" sub-section can include affordance(s) of one or more virtual spaces that are associated with the team, such as communication channels, collaborative documents, direct messaging instances, audio or video synchronous or asynchronous meetings, and/or the like. In at least one example, the user can associate selected virtual spaces with the team sub-section, such as by dragging and dropping, pinning, or otherwise associating selected virtual spaces with the team sub-section.

Channels Within the Group-Based Communication System

In some embodiments, the group-based communication system is a channel-based messaging platform, as shown in FIG. 2A. Within the group-based communication system, communication may be organized into channels, each dedicated to a particular topic and a set of users. Channels are generally a virtual space relating to a particular topic comprising messages and files posted by members of the channel.

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

The channel discussion may persist for days, months, or years and provide a historical log of user activity. Members of a particular channel can post messages within that channel that are visible to other members of that channel together with other messages in that channel. Users may select a channel for viewing to see only those messages relevant to the topic of that channel without seeing messages posted in other channels on different topics. For example, a software development company may have different channels for each software product being developed, where developers working on each particular project can converse on a generally singular topic (e.g., project) without noise from unrelated topics. Because the channels are generally persistent and directed to a particular topic or group, users can quickly and easily refer to previous communications for reference. In some embodiments, channel pane 218 may display information related to a channel that a user has selected in navigation pane 206. For example, a user may select the project_zen channel to discuss the ongoing software development efforts for Project Zen. In some embodiments, channel pane 218 may include a header comprising information about the channel, such as the channel name, the list of users in the channel, and other channel controls. Users may be able to pin items to the header for later access and to add bookmarks to the header. In some embodiments, links to collaborative documents may be included in the header. In further embodiments, each channel may have a corresponding virtual space which includes channel-related information such as a channel summary, tasks, bookmarks, pinned documents, and other channel-related links which may be editable by members of the channel.

A communication channel or other virtual space can be associated with data and/or content other than messages, or data and/or content that is associated with messages. For example, non-limiting examples of additional data that can be presented via channel pane 218 of user interface 200 include collaborative documents (e.g., documents that can be edited collaboratively, in real-time or near real-time, etc.), audio and/or video data associated with a conversation, members added to and/or removed from the communication channel, file(s) (e.g., file attachment(s)) uploaded and/or removed from the communication channel), application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

Channel pane 218 may include messages such as message 222, which is content posted by a user into the channel. Users may post text, images, videos, audio, or any other file as message 222. In some embodiments, particular identifiers (in messages or otherwise) may be denoted by prefixing them with predetermined characters. For example, channels may be prefixed by the "#" character (as in #project_zen) and username may be prefixed by the "@" character (as in @austin_a). Messages such as message 222 may include an indication of which user posted the message and the time at which the message was posted. In some embodiments, users may react to messages such as message 222 by selecting reaction button 224. Reaction button 224 allows users to select an icon (sometimes called a reactji in this context), such as a thumbs up, to be associated with the message. Users may respond to messages such as message 222 of another user with a new message such as message 222. In some embodiments, such conversations in channels may further be broken out into threads. Threads may be used to aggregate messages related to a particular conversation together to make the conversation easier to follow and reply to, without cluttering the main channel with the discussion. Under the message beginning the thread appears thread reply preview 226. Thread reply preview 226 may show information related to the thread, such as, for example, the number of replies and the members who have replied. Thread replies may appear in thread pane 230 that may be separate from channel pane 218 and may be viewed by other members of the channel by selecting thread reply preview 226 in channel pane 218.

In some embodiments, one or both of channel pane 218 and thread pane 230 may include compose pane 228. Compose pane 228 allows users to compose and transmit messages 222 to the members of the channel or to those members of the channel who are following the thread (when the message is sent in a thread). Compose pane 228 may have text editing functions such as bold, strikethrough, and italicize. Compose pane 228 may also allow users to format their messages or attach files such as collaborative documents, images, videos, or any other files to share with other members of the channel. In some embodiments, compose pane 228 may enable additional formatting options such as numbered or bulleted lists via either the user interface or an API. Compose pane 228 may also function as a workflow trigger to initiate workflows related to a channel or message. In further embodiments, links or documents sent via compose pane 228 may include unfurl instructions related to how the content should be displayed.

Synchronous Multimedia Collaboration Sessions

Figure 2B:
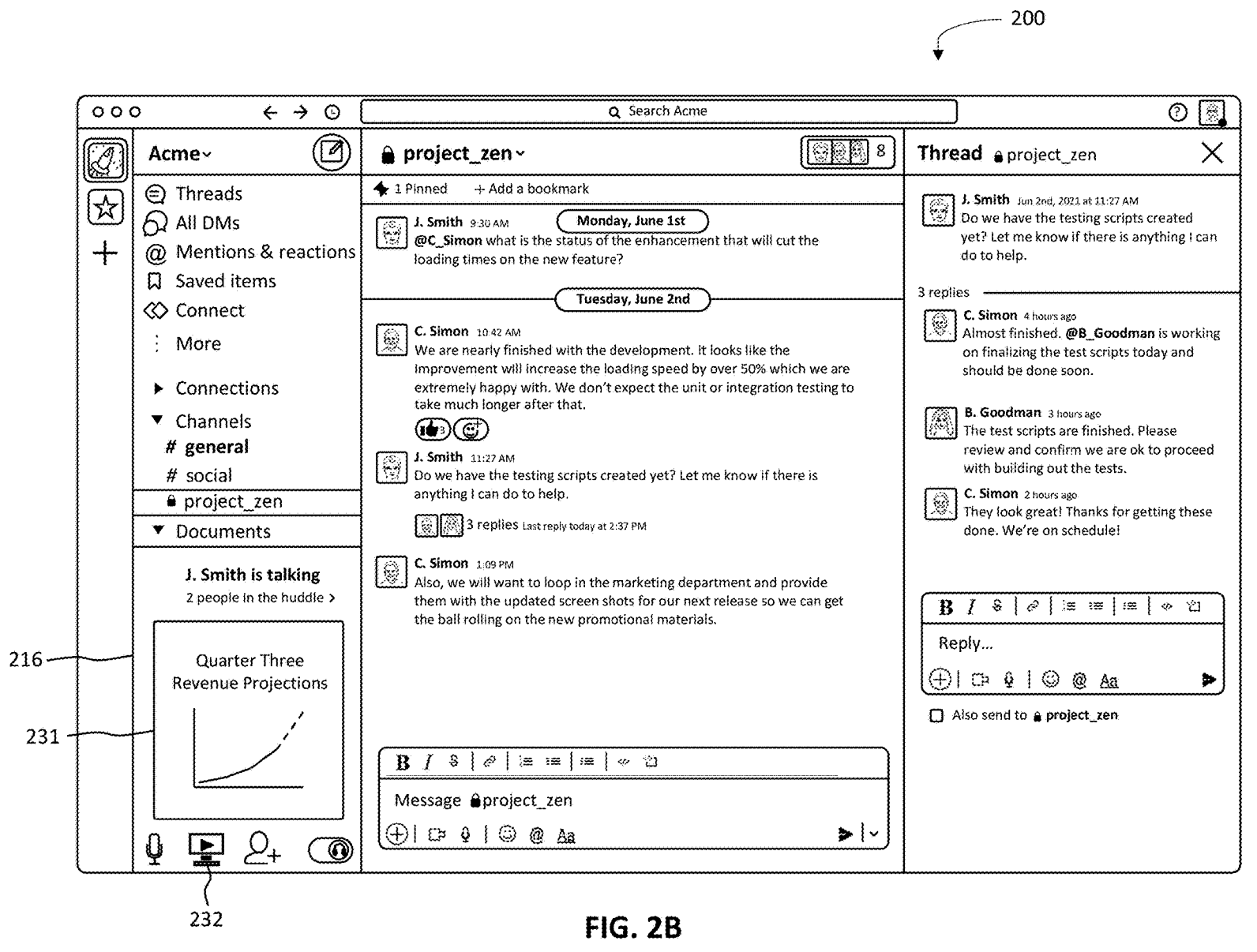

FIG. 2B illustrates a synchronous multimedia collaboration session that has been triggered from a channel, as shown in pane 216. Synchronous multimedia collaboration sessions may provide ambient, ad hoc multimedia collaboration in the group-based communication system. Users of the group-based communication system can quickly and easily join and leave these synchronous multimedia collaboration sessions at any time, without disrupting the synchronous multimedia collaboration session for other users. In some embodiments, synchronous multimedia collaboration sessions may be based around a particular topic, a particular channel, a particular direct message or multi-person direct message, or a set of users, while in other embodiments, synchronous multimedia collaboration sessions may exist without being tied to any channel, topic, or set of users.

Synchronous multimedia collaboration session pane 216 may be associated with a session conducted for a plurality of users in a channel, users in a multi-person direct message conversation, or users in a direct message conversation. Thus, a synchronous multimedia collaboration session may be started for a particular channel, multi-person direct message conversation, or direct message conversation by one or more members of that channel or conversation. Users may start a synchronous multimedia collaboration session in a channel as a means of communicating with other members of that channel who are presently online. For example, a user may have an urgent decision and want immediate verbal feedback from other members of the channel. As another example, a synchronous multimedia collaboration session may be initiated with one or more other users of the group-based communication system through direct messaging. In some embodiments, the audience of a synchronous multimedia collaboration session may be determined based on the context in which the synchronous multimedia collaboration session was initiated. For example, starting a synchronous multimedia collaboration session in a channel may automatically invite the entire channel to attend. As another example. Starting a synchronous multimedia collaboration session allows the user to start an immediate audio and/or video conversation with other members of the channel without relying on scheduling or initiating a communication session through a third-party interface. In some embodiments, users may be directly invited to attend a synchronous multimedia collaboration session via a message or notification.

Synchronous multimedia collaboration sessions may be short, ephemeral sessions from which no data is persisted. Alternatively, in some embodiments, synchronous multimedia collaboration sessions may be recorded, transcribed, and/or summarized for later review. In other embodiments, contents of the synchronous multimedia collaboration session may automatically be persisted in a channel associated with the synchronous multimedia collaboration session. Members of a particular synchronous multimedia collaboration session can post messages within a messaging thread associated with that synchronous multimedia collaboration session that are visible to other members of that synchronous multimedia collaboration session together with other messages in that thread.

The multimedia in a synchronous multimedia collaboration session may include collaboration tools such as any or all of audio, video, screen sharing, collaborative document editing, whiteboarding, co-programming, or any other form of media. Synchronous multimedia collaboration sessions may also permit a user to share the user's screen with other members of the synchronous multimedia collaboration session. In some embodiments, members of the synchronous multimedia collaboration session may mark-up, comment on, draw on, or otherwise annotate a shared screen. In further embodiments, such annotations may be saved and persisted after the synchronous multimedia collaboration session has ended. A canvas may be created directly from a synchronous multimedia collaboration session to further enhance the collaboration between users.

In some embodiments, a user may start a synchronous multimedia collaboration session via a toggle in synchronous multimedia collaboration session pane 216 shown in FIG. 2B. Once a synchronous multimedia collaboration session has been started, synchronous multimedia collaboration session pane 216 may be expanded to provide information about the synchronous multimedia collaboration session such as how many members are present, which user is currently talking, which user is sharing the user's screen, and/or screen share preview 231. In some embodiments, users in the synchronous multimedia collaboration session may be displayed with an icon indicating that they are participating in the synchronous multimedia collaboration session. In further embodiments, an expanded view of the participants may show which users are active in the synchronous multimedia collaboration session and which are not. Screen share preview 231 may depict the desktop view of a user sharing the user's screen, or a particular application or presentation. Changes to the user's screen, such as the user advancing to the next slide in a presentation, will automatically be depicted in screen share preview 231. In some embodiments, screen share preview 231 may be actuated to cause screen share preview 231 to be enlarged such that it is displayed as its own pane within the group-based communication system. Synchronous multimedia collaboration session pane 216 may comprise tools for the synchronous multimedia collaboration session allowing a user to mute the user's microphone or invite other users. In some embodiments, synchronous multimedia collaboration session pane 216 may comprise screen share button 232. Screen share button 232 may permit a user to share the user's screen with other members of the synchronous multimedia collaboration session pane 216. In some embodiments, screen share button 232 may provide a user with additional controls during a screen share. For example, a user sharing the user's screen may be provided with additional screen share controls to specify which screen to share, to annotate the shared screen, or to save the shared screen. When no synchronous multimedia collaboration session is active, synchronous multimedia collaboration session pane 216 may be associated with a currently selected channel, direct message, or multi-person direct message such that a synchronous multimedia collaboration session may be initiated and associated with the currently selected channel, direct message, or multi-person direct message. Similarly, when a synchronous multimedia collaboration session is active, the synchronous multimedia collaboration session pane 216 may be associated with a channel in which the synchronous multimedia collaboration session was initiated. In some embodiments, synchronous multimedia collaboration session pane 216 may instead be unassociated with any channels, multi-person direct messages, or direct messages.

A list of synchronous multimedia collaboration sessions may include one or more active synchronous multimedia collaboration sessions selected for recommendation. For example, the synchronous multimedia collaboration sessions may be selected from a plurality of currently active synchronous multimedia collaboration sessions. Further, the synchronous multimedia collaboration sessions may be selected based in part on user interaction with the sessions or some association of the instant user with the sessions or users involved in the sessions. For example, the recommended synchronous multimedia collaboration sessions may be displayed based in part on the instant user having been invited to a respective synchronous multimedia collaboration session or having previously collaborated with the users in the recommended synchronous multimedia collaboration session. In some embodiments, the list of synchronous multimedia collaboration sessions further includes additional information for each respective synchronous multimedia collaboration session, such as an indication of the participating users or number of participating users, a topic for the synchronous multimedia collaboration session, and/or an indication of an associated group-based communication channel, multi-person direct message conversation, or direct message conversation.

In some embodiments, a list of recommended active users may include a plurality of group-based communication system users recommended based on at least one of user activity, user interaction, or other user information. For example, the list of recommended active users may be selected based on an active status of the users within the group-based communication system; historic, recent, or frequent user interaction with the instant user (such as communicating within the group-based communication channel); or similarity between the recommended users and the instant user (such as determining that a recommended user shares common membership in channels with the instant user). In some embodiments, machine learning techniques such as cluster analysis can be used to determine recommended users. The list of recommended active users may include status user information for each recommended user, such as whether the recommended user is active, in a meeting, idle, in a synchronous multimedia collaboration session, or offline. In some embodiments, the list of recommended active users further comprises a plurality of actuatable buttons corresponding to some of or all the recommended users (for example, those recommended users with a status indicating availability) that, when selected, may be configured to initiate at least one of a text-based communication session (such as a direct message conversation) or a synchronous multimedia collaboration session.

In some embodiments, one or more recommended asynchronous multimedia collaboration sessions or meetings are displayed in an asynchronous meeting section. By contrast with a synchronous multimedia collaboration session (described above), an asynchronous multimedia collaboration session allows each participant to collaborate at a time convenient to them. This collaboration participation is then recorded for later consumption by other participants, who can generate additional multimedia replies. In some embodiments, the replies are aggregated in a multimedia thread (for example, a video thread) corresponding to the asynchronous multimedia collaboration session. For example, an asynchronous multimedia collaboration session may be used for an asynchronous meeting where a topic is posted in a message at the beginning of a meeting thread and participants of the meeting may reply by posting a message or a video response. The resulting thread then comprises any documents, video, or other files related to the asynchronous meeting. In some embodiments, a preview of a subset of video replies may be shown in the asynchronous collaboration session or thread. This can allow, for example, a user to jump to a relevant segment of the asynchronous multimedia collaboration session or to pick up where they left off previously.

In some embodiments, the group-based communication system may comprise one or more canvases (or one or more links to canvases). A canvas can include a flexible workspace for curating, organizing, and sharing collections of information between users. Such canvases may be associated with a synchronous multimedia collaboration session, an asynchronous multimedia collaboration session, a channel, a multi-person direct message conversation, or a direct message conversation. Alternatively, or in addition, a user might have one or more private canvases that are not associated with any other users. Shared canvases can be configured to be accessed and/or modified by two or more users with appropriate permissions. In some embodiments, canvases can be configured to enable sharing of content including (but not limited to) text, images, videos, GIFs, drawings (e.g., user-generated drawings via a drawing interface), or gaming content. In some embodiments, users accessing a canvas can add new content or delete (or modify) content previously added. In some embodiments, appropriate permissions may be utilized for a user to add content or to delete or modify content added by a different user. Thus, for example, some users may only be able to access a canvas in view-only mode, while other users may be able to access the canvas in an edit mode allowing those users to add or modify its contents. In some examples, a canvas can be shared via a message in a channel, multi-person direct message, or direct message, such that data associated with the canvas is accessible to and/or rendered interactable for members of the channel or recipients of the multi-person direct message or direct message.

Connecting Within the Group-Based Communication System

Figure 2C:
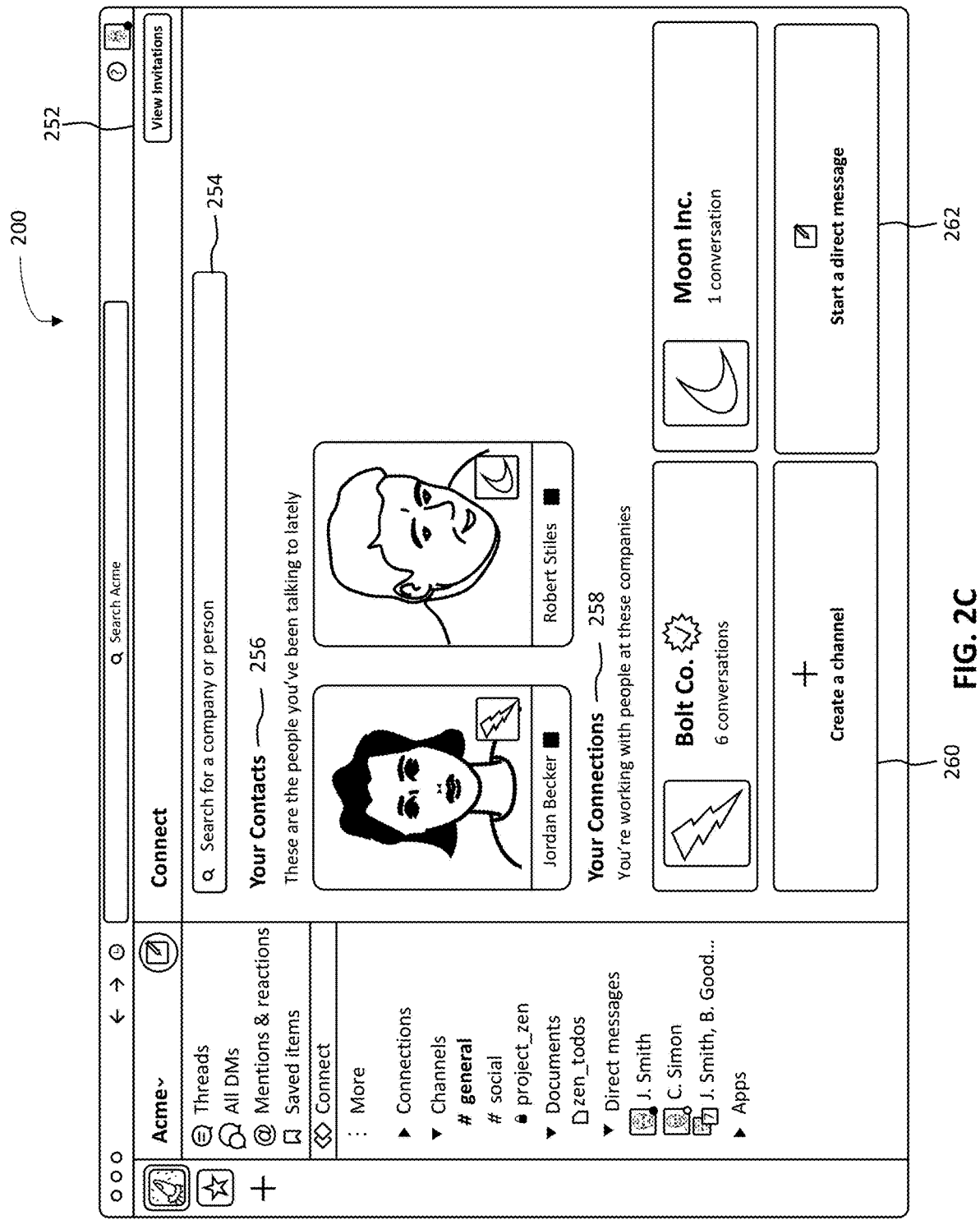
FIG. 2C illustrates a user interface for inter-organization collaboration within the group-based communication system for certain embodiments.

FIG. 2C illustrates user interface 200 displaying connect pane 252. Connect pane 252 provides tools and resources for users to connect across different organizations, where each organization may have their own (normally private) instance of the group-based communication system or may not yet belong to the group-based communication system. For example, a first software company may have a joint venture with a second software company with whom they wish to collaborate on jointly developing a new software application. Connect pane 252 may enable users to determine which other users and organizations are already within the group-based communication system, and to invite those users and organizations currently outside of the group-based communication system to join.

Connect pane 252 may comprise connect search bar 254, recent contacts 256, connections 258, create channel button 260, and start direct message button 262. Connect search bar 254 permits a user to search for users within the group-based communication system. In some embodiments, only users from organizations that have connected with the user's organization will be shown in the search results. In other embodiments, users from any organization that uses the group-based communication system can be displayed. In still other embodiments, users from organizations that do not yet use the group-based communication can also be displayed, allowing the searching user to invite them to join the group-based communication system. In some embodiments, users can be searched for via their group-based communication system username or their email address. In some embodiments, email addresses may be suggested or auto-completed based on external sources of data such as email directories or the searching user's contact list.

In some embodiments, external organizations as well as individual users may be shown in response to a user search. External organizations may be matched based on an organization name or internet domain, as search results may include organizations that have not yet joined the group-based communication system (similar to searching and matching for a particular user, discussed above). External organizations may be ranked based in part on how many users from the user's organization have connected with users of the external organization. Responsive to a selection of an external organization in a search result, the searching user may be able to invite the external organization to connect via the group-based communication system.

In some embodiments, recent contacts 256 may display users with whom the instant user has recently interacted. The recent contacts 256 may display the user's name, company, and a status indication. Recent contacts 256 may be ordered based on which contacts the instant user most frequently interacts with or based on the contacts with whom the instant user most recently interacted. In some embodiments each recent contact of recent contacts 256 may be an actuatable control allowing the instant user to quickly start a direct message conversation with the recent contact, invite them to a channel, or take any other appropriate user action for that recent contact.

In some embodiments, connections 258 may display a list of companies (e.g., organizations) with which the user has interacted. For each company, the name of the company may be displayed along with the company's logo and an indication of how many interactions the user has had with the company, for example the number of conversations. In some embodiments, each connection of connections 258 may be an actuatable control allowing the instant user to quickly invite the external organization to a shared channel, display recent connections with that external organization, or take any other appropriate organization action for that connection.

In some embodiments, create channel button 260 allows a user to create a new shared channel between two different organizations. Selecting create channel button 260 may further allow a user to name the new connect channel and enter a description for the connect channel. In some embodiments, the user may select one or more external organizations or one or more external users to add to the shared channel. In other embodiments, the user may add external organizations or external users to the shared channel after the shared channel is created. In some embodiments, the user may elect whether to make the connect channel private (i.e., accessible only by invitation from a current member of the private channel).

In some embodiments, start direct message button 262 allows a user to quickly start a direct message (or multi-person direct message) with external users at an external organization. In some embodiments, the external user identifier at an external organization may be supplied by the instant user as the external user's group-based communication system username or as the external user's email address. In some embodiments, an analysis of the email domain of the external user's email address may affect the message between the user and the external user. For example, the external user's identifier may indicate (for example, based on an email address domain) that the user's organization and the external user's organization are already connected. In some such embodiments, the email address may be converted to a group-based communication system username. Alternatively, the external user's identifier may indicate that the external user's organization belongs to the group-based communication system but is not connected to the instant user's organization. In some such embodiments, an invitation to connect to the instant user's organization may be generated in response. As another alternative, the external user may not be a member of the group-based communication system, and an invitation to join the group-based communication system as a guest or a member may be generated in response.

Collaborative Documents

Figure 2D:
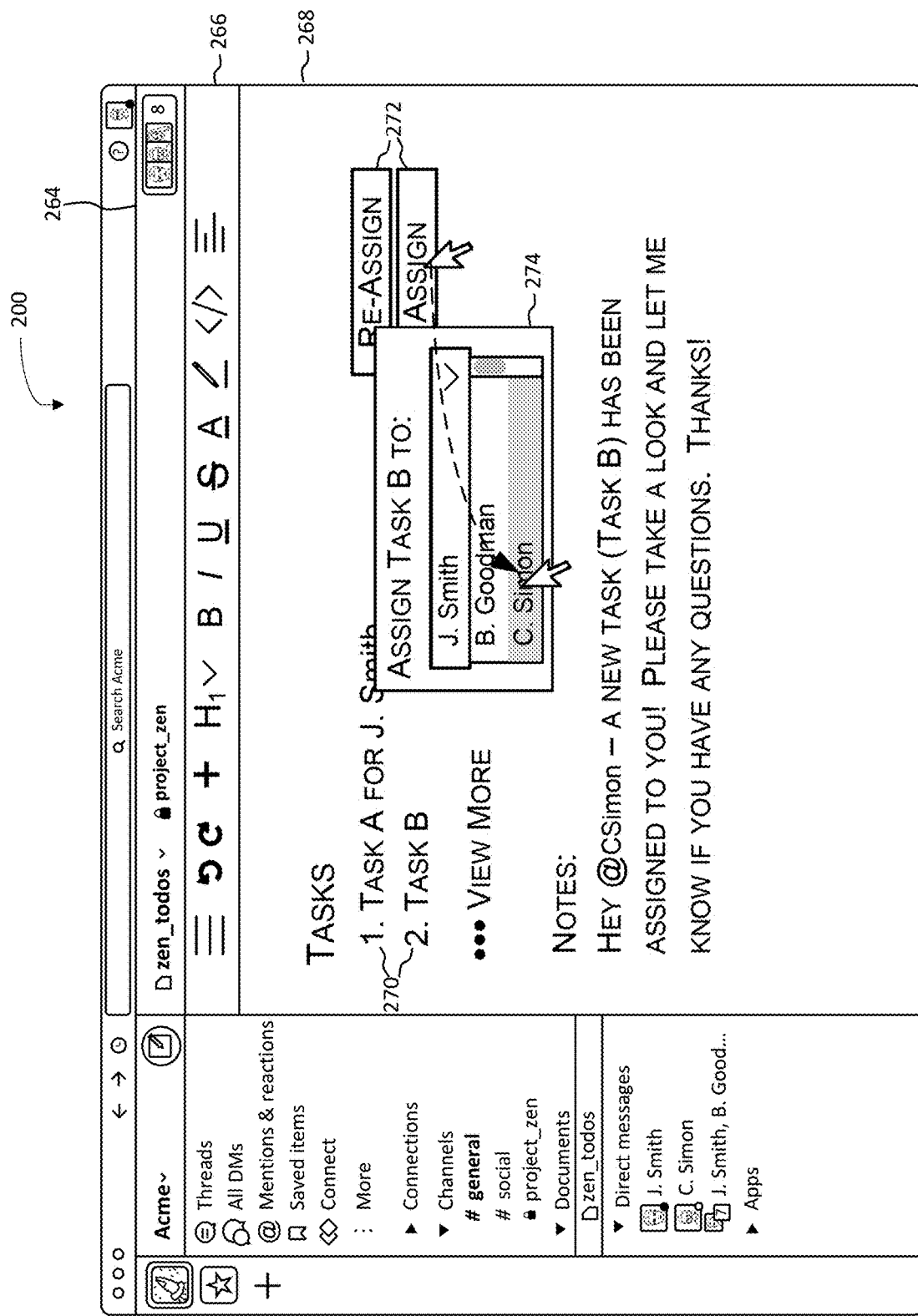
FIG. 2D illustrates a user interface for collaborative documents within the group-based communication system for certain embodiments.

FIG. 2D illustrates user interface 200 displaying collaboration document pane 264. A collaborative document may be any file type, such as a PDF, video, audio, word processing document, etc., and is not limited to a word processing document or a spreadsheet. A collaborative document may be modified and edited by two or more users. A collaborative document may also be associated with different user permissions, such that based on a user's permissions for the document (or sections of the document as discussed below), the user may selectively be permitted to view, edit, or comment on the collaborative document (or sections of the collaborative document). As such, users within the set of users having access to the document may have varying permissions for viewing, editing, commenting, or otherwise interfacing with the collaborative document. Collaborative documents may allow users to simultaneously or asynchronously create and modify documents. Collaborative documents may integrate with the group-based communication system and can both initiate workflows and be used to store the results of workflows. Collaboration document pane 264 may comprise collaborative document toolbar 266 and collaborative document 268. In some embodiments, collaborative document toolbar 266 may provide the ability to bold, italicize, underline, or otherwise format text, the ability to undo or redo actions, the ability to insert and format pictures and shapes, or any other word processing functionality to modify the content within collaborative document 268.

In some embodiments, collaborative documents may comprise free-form unstructured sections and workflow-related structured sections. In some embodiments, unstructured sections may include areas of the document in which a user can freely modify the collaborative document without any constraints. For example, a user may be able to freely type text to explain the purpose of the document. In some embodiments, a user may add a workflow or a structured workflow section by typing the name of (or otherwise mentioning) the workflow. In further embodiments, typing the "at" sign (@), a previously selected symbol, or a predetermined special character or symbol may provide the user with a list of workflows the user can select to add to the document. For example, a user may indicate that a marketing team member needs to sign off on a proposal by typing "!Marketing Approval" to initiate a workflow that culminates in a member of the marketing team approving the proposal. Placement of an exclamation point prior to the group name of "Marketing Approval" initiates a request for a specification action, in this case routing the proposal for approval. In some embodiments, structured sections may include text entry, selection menus, tables, checkboxes, tasks, calendar events, or any other document section. In further embodiments, structured sections may include text entry spaces that are a part of a workflow. For example, a user may enter text into a text entry space detailing a reason for approval, and then select a submit button that will advance the workflow to the next step of the workflow. In some embodiments, the user may be able to add, edit, or remove structured sections of the document that make up the workflow components.

In embodiments, sections of the collaborative document may have individual permissions associated with them. For example, a collaborative document having sections with individual permissions may provide a first user permission to view, edit, or comment on a first section, while a second user does not have permission to view, edit, or comment on the first section. Alternatively, a first user may have permissions to view a first section of the collaborative document, while a second user has permissions to both view and edit the first section of the collaborative document. The permissions associated with a particular section of the document may be assigned by a first user via various methods, including manual selection of the particular section of the document by the first user or another user with permission to assign permissions, typing or selecting an "assignment" indicator, such as the "@" symbol, or selecting the section by a name of the section. In further embodiments, permissions can be assigned for a plurality of collaborative documents at a single instance via these methods. For example, a plurality of collaborative documents each has a section entitled "Group Information," where the first user with permission to assign permissions desires an entire user group to have access to the information in the "Group Information" section of the plurality of collaborative documents. In embodiments, the first user can select the plurality of collaborative documents and the "Group Information" section to effectuate permissions to access (or view, edit, etc.) to the entire user group the "Group Information" section of each of the plurality of collaborative documents. In some embodiments, the collaborative document comprises one or more tasks 270 along with one or more corresponding assignment options 272, as shown. In some embodiments, an assignment dropdown menu 274 may be displayed in response to a user selecting one of the one or more assignment options 272.

Help Content

Embodiments are contemplated in which personalized help content may be, via machine learning, curated and presented to users within the group-based communication system to increase user sophistication in performing actions in the group-based communication system or in external applications associated with the group-based communication system. Said help content may relate to any of a number of user actions and/or features within the group-based communication system such as, for example, any of posting in a private or public channel, sending a direct message or multiple person direct message, reacting to a post, uploading a file, mentioning another user, reading messages using a native mobile application associated with the group-based communication system, using a synchronous multimedia collaboration session associated with the group-based communication system, using external collaboration features, accessing help content of the group-based communication system, using and/or creating an automated workflow, or other actions associated with the group-based communication system. Further, in some embodiments, a user sophistication metric may be established. For example, a user sophistication score may be determined for a user of the group-based communication system indicative of the user's sophistication and/or familiarity with performing said actions within the group-based communication system. In some embodiments, machine learning techniques are employed to determine the most relevant help content for each individual user, as will be described in further detail below.

Embodiments of the present disclosure provide a technical solution to one or more of the aforementioned technical problems. Specifically, embodiments of the present disclosure provide a machine learning model that is trained to automatically curate and personalize help content for individual users such that technical features of the group-based communication system are more thoroughly utilized by users. By individually selecting help content for each user using the machine learning model the help content can be selected to substantially increase a rate at which users become familiar with and use the technical features of the group-based communication system. Additionally, a technical solution is provided by periodically or continually updating the training of the machine learning model with feedback from users who have engaged with the help content. As such, the machine learning model is improved over time and adapts to the specific intricacies in how users interact with the help content and the features of the group-based communication system. It should further be understood that the machine learning model provides a means for the list of recommended help content to change over time as the user's knowledge base grows and as new features are added to the group-based communication system.

Another technical improvement of embodiments of the present disclosure is that the machine learning model prevents unnecessary and redundant help content from being transmitted to and presented to the user, such as help content relating to features that the user has already interacted with and already has knowledge of. By preventing unnecessary notifications from being displayed to the user processing resources are freed up for more valuable operations and data resources are not wasted on loading and/or storing unnecessary information. Accordingly, embodiments are contemplated in which only help content that is valuable and necessary for the individual user is selected to be transmitted and presented. The process of selecting valuable content to be recommended to the user by the machine learning model thus elevates strains on bandwidth and reduces the overall amount of resources consumed at the client device.

Figure 3:
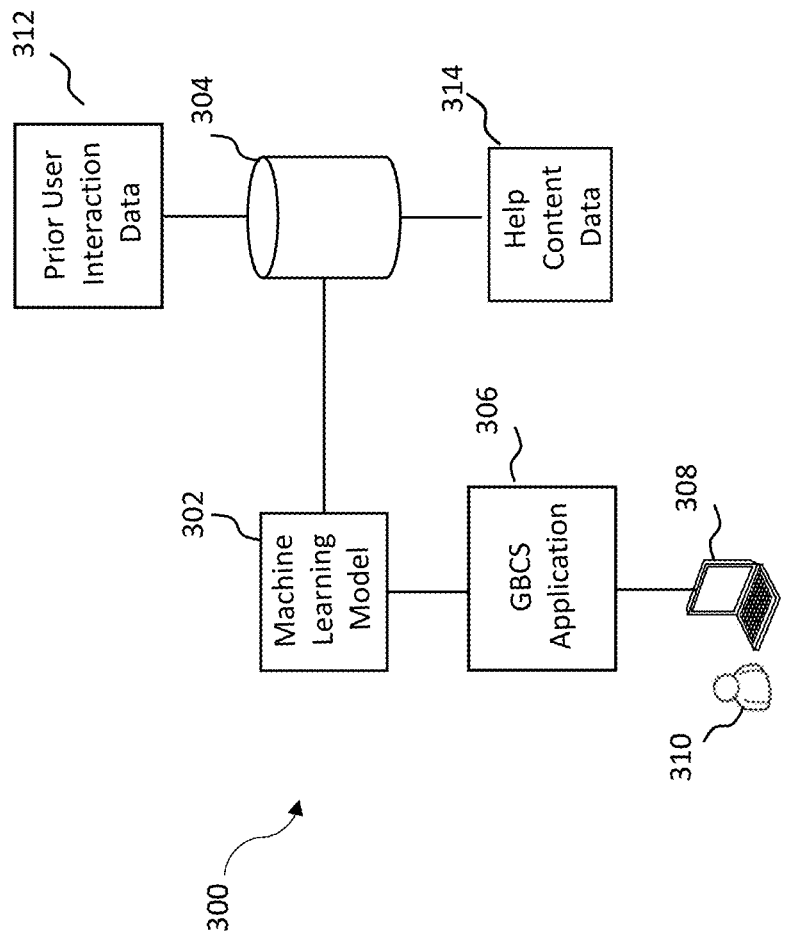
FIG. 3 illustrates an exemplary adaptive help content system relating to some embodiments.

FIG. 3 illustrates an exemplary adaptive help content system 300 relating to some embodiments. In some embodiments, the adaptive help content system 300 comprises a machine learning model 302 coupled to a training data store 304. In some such embodiments, the training data store 304 comprises any combination of historical help content data, group-based communication system data, user data, and other suitable forms of training data for training the machine learning model 302. For example, in some embodiments, the training data store 304 comprises prior user engagement data 312 and help content data 314 associated with the group-based communication system.

The prior user engagement data 312 may include historical user interactions with the group-based communication system. The help content data 314 may include data relating to help content on the group-based communication system including user interaction and engagement with said help content, such as, for example, an indication of which users have accessed and/or consumed each respective item of help content. In some embodiments, additional forms of data may be used for training the machine learning model 302. For example, in some embodiments, other types of user data may be used varying from user engagement, such as static data including a user's role within an organization, an amount of time a user account has existed, and/or other user data.

In some embodiments, the machine learning model 302 is trained to recommend help resources to users so as to increase user sophistication within the group-based communication system. For example, machine learning model 302 may be a binary classification model (determining whether or not a given piece of help content will or will not be useful), multiclass classification (determining classes of help content items that will be useful in assisting the user perform different tasks), or a regression model (determining a helpfulness score for a given help content item given a particular context). Broadly, machine learning model 302 may utilize supervised learning, unsupervised learning, or reinforcement learning. Any type of machine learning algorithm model is contemplated for use with the invention, including regression algorithms (linear or logistic), decision tree algorithms, support vector machines (SVMs), Bayesian algorithms, k-nearest-neighbors models, k means, random forest models, dimensionality reduction algorithms, or gradient ascent algorithms (including neural network models). Here, the model may monitor user interactions to determine what specific features the users have used and become familiar with. Accordingly, the system 300 may initially recommend help content relating to simple features of the group-based communication system to users with low sophistication, but eventually, once the user has become more sophisticated, the system 300 may recommend help content relating to complex features of the group-based communication system. In some embodiments, the machine learning model 302 may consider a rate of change of the user sophistication score over time. Accordingly, the machine learning model 302 may be updated and/or retrained based at least in part on the rate of change of the user sophistication score after help content has been accessed.

In some embodiments, the machine learning model 302 may be associated with an application 306 associated with the group-based communication system. For example, in some embodiments, the machine learning model 302 may be hosted on the application 306 or is at least communicatively coupled to the application 306. In some embodiments, the application 306 may be accessed from, or may be executed on, at least one user device 308 operated by a user 310, as shown. For example, in some embodiments, the application 306 runs on the user device 308. In some embodiments, the machine learning model 302 may further receive training data from the application 306. For example, user interaction data between the user 310 and the group-based communication system may be used to update the machine learning model 302 and/or the training data store 304. Further still, in some embodiments, the machine learning model 302 may receive any of a user sophistication score and/or user interaction data from the application 306. In some embodiments, the user sophistication score and/or user interaction data from the application 306 may be used to train the machine learning model to predict, for example, a change in a user sophistication score (given the user's prior interactions) after accessing a given piece of help content.

In some embodiments, the machine learning model 302 may be updated and retrained based on user interaction data and/or user feedback received after the user has accessed help content. For example, if a user consumes help content relating to an action and the subsequently received user interaction data shows that the user successfully performs said action (thereby, for example, increasing a user sophistication score associated with the user), then the machine learning model 302 may be trained to continue with similar help content suggestions to other users in order to similarly increase their sophistication. Alternatively, or additionally, if subsequently received user interaction data shows that the user has not successfully performed the action, or attempted to perform the action but did not succeed, the machine learning model 302 may be retrained to adjust the help content suggestions. According to one example, the machine learning model 302 may determine that a specific type of help content for a particular user, for example guided tutorials for a first set of features, resulted in successful performances of actions related to the first set of features. The machine learning model may then use this prior data to suggest a guided tutorial for the user for a new feature, rather than another type of help content (for example a text article or a video). Similarly, in some embodiments, users may provide explicit feedback relating to the help content. For example, the user may be prompted to participate in a survey or other feedback mechanism to provide feedback on whether the help content was helpful and whether the user feels comfortable with performing the related action in the group-based communication system. The machine learning model may thus be further tuned to provide better recommendations for the user, resulting in an improved user interface and experience that increases training and usage of a variety of features of the group-based communication system.

Embodiments are contemplated in which the machine learning model 302 is configured to adapt to specific trends of how users engage with help content and interact with features of the group-based communication system. For example, the machine learning model 302 may learn an optimal order for recommending help content for each user to thereby increase user engagement and overall user sophistication. In other words, if user sophistication increases more as a result of recommending help content item A followed by help content item B than a result of recommending help content item B followed by help content item A, the machine learning model 302 may preferentially recommend help content item A before help content item B, even when help content item B would otherwise be preferred.

Figure 4:
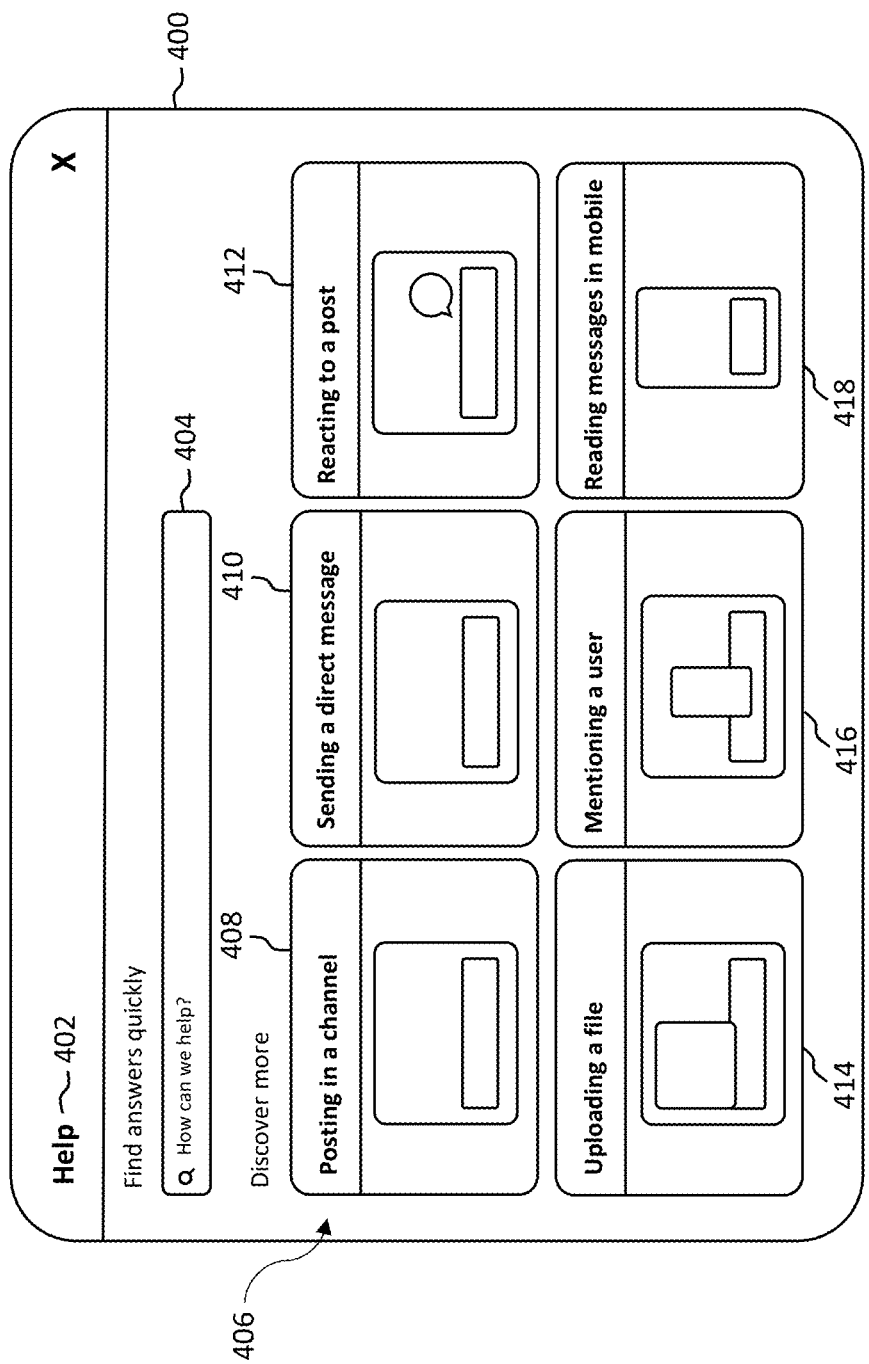
FIG. 4 illustrates an exemplary user interface of the group-based communication system relating to some embodiments.

FIG. 4 illustrates an exemplary user interface 400 of the group-based communication system relating to some embodiments. In some embodiments, the user interface 400 includes a help page 402, as shown. In some embodiments, the help page 402 may be accessed from within the group-based communication system. The help page 402 includes a search bar 404 operable to search for help content within the group-based communication system. In some embodiments, the help page 402 includes a list of recommended help content 406, as shown. In some embodiments, the list of recommended help content 406 includes any combination of help articles, video tutorials, GIF tutorials, interactive tours, dynamic prompts, help overlays, and other suitable forms of help content.

In some embodiments, a number of help content articles may be included in the list of recommended help content 406, as shown. For example, the list of recommended help content 406 may include one or more of a channel post help article 408, a direct message help article 410, a post reaction help article 412, a file upload help article 414, a user mention help article 416, and a mobile help article 418. However, it should be understood that other help articles and other forms of help content are also contemplated. Further, in some cases, the items in the list of 406 may be reordered, adjusted, removed, or altered in other suitable ways, for example, to adapt the help page 402 to the needs and sophistication of a specific user, as will be described in further detail below. Further still, it should be understood that, in some embodiments, the list of recommended help content 406 may include a single item of help content. In some embodiments, the number of items may be determined based on a relevancy of help content items to a particular user.

In some embodiments, the items of help content in the list of recommended help content 406 are selected based on a determination that the user has not performed actions or accessed features associated with the help content. For example, an initial list of recommended help content 406 may be presented to the user including help content relating to a number of actions or features with which the user is unfamiliar. Once a user has performed the actions, accessed the help content, or interacted with the features associated with the help content, those specific items of help content may be removed from the list of recommended help content 406. In some embodiments, the list of recommended help content 406 may be updated periodically or may be updated responsive to a user action such as a user performing an action within the group-based communication system or accessing the help page 402.

Additionally, in some embodiments, the types of help content recommended to the user may be personalized based on learned data of the user. Here, the type of help content may be selected based on detecting positive user engagement of the user or of similar users with specific types of help content. For example, it may be determined that the user engages with help content in the form of articles. Accordingly, articles may be included in the list of recommended help content 406 for that user.

In some embodiments, the list of recommended help content 406 for a given task may be adapted specifically to individual users based on the user's preferred help content type. For example, in some embodiments, the machine learning model 302 is operable to select what content types appear in the list of recommended help content 406 and the order of the content presented in the list of recommended help content 406. The help content and content type may be selected based on any of user actions within the group-based communication system and other user data such as the user's role, an organization of the user, or other user data. For example, in some embodiments, specific help content may be selected based on a determination that the user is an administrator. Similarly, for example, a user assigned to an accountant role may be presented with help content relating to accounting and a user assigned to a human resources role may be presented with help content relating to human resource management in the group-based communication system. In some embodiments, roles may be explicitly assigned for a user account. However, it should be understood that, in some embodiments, user roles may be inferred based on a user's actions or other data such that the help content presentation may be uniquely adapted to different organizational structures.

Figure 5A:
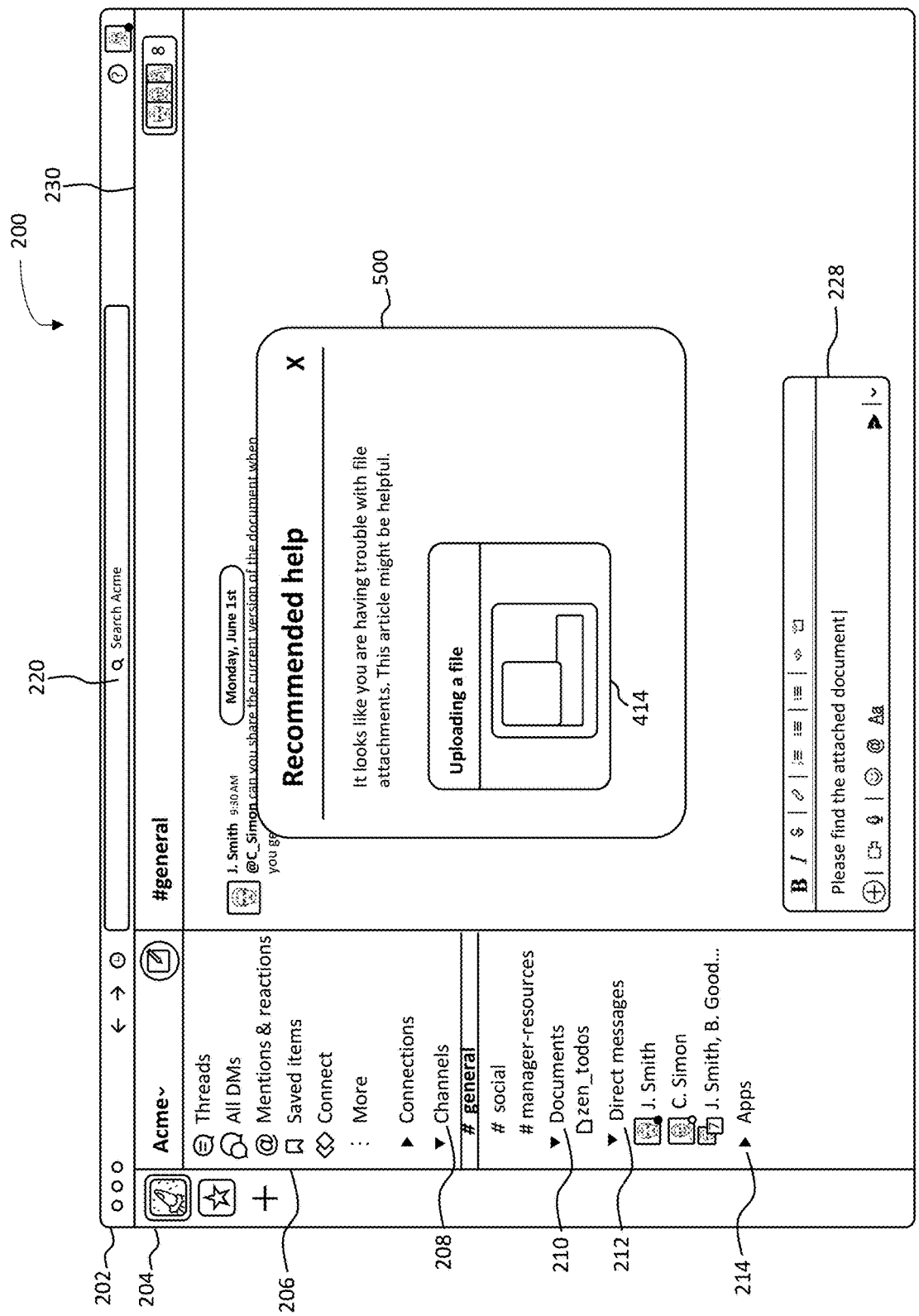
FIG. 5A illustrates an exemplary user interface relating to some embodiments.

FIG. 5A illustrates an exemplary user interface 200 relating to some embodiments. In some embodiments, the user interface 200 may include similar elements as described above with respect to FIGS. 2A-2D. In some embodiments, a help recommendation prompt 500 may be presented to a user via the user interface 200, as shown. In some cases, the help recommendation prompt 500 may be presented to the user based on one or more actions performed by the user within the group-based communication system. In some embodiments, the help recommendation prompt 500 may include one or more items of help content accessible to the user. For example, the file upload help article 414 may be included, as shown. The help recommendation prompt 500 may be displayed near the center of the user interface 200, as shown. However, embodiments are contemplated in which the help recommendation prompt 500 may be displayed elsewhere in the user interface 200, such as, for example, in the navigation pane 206.

In some embodiments, a particular type of help content may be selected for inclusion in the help recommendation prompt 500 based on user data, user interaction data, or other data available to the group-based communication system. In some embodiments, the machine learning model 302 may be used to select relevant help content to be presented in the help recommendation prompt 500. Further, in some embodiments, the machine learning model 302 is operable to trigger presentation of the help recommendation prompt 500.

In one example, a user of the group-based communication system may attempt to attach a file to a group-based communication message, as shown. Here, the help recommendation prompt 500 may be presented to the user in response to determining that the user is struggling with performing a certain action. For example, a determination that the user is attempting to attach a file may be based on parsing text input into the compose pane 228, as shown. Accordingly, in the case of identifying that the user is trying to attach a file, the file upload help article 414 may be suggested to the user because the user is struggling with attaching or uploading a file based on the user's actions within the group-based communication system. Similarly, other individually targeted help content may be presented to the user based on determining that the user is struggling with a certain action or based on a determination that the action could benefit the user's experience within the group-based communication system. For example, the machine learning model may determine that a user is unaware of an efficient route to complete an action within the group-based communication system based on historical data showing that the user repeatedly uses a less efficient route, or that users who use the less-efficient route increase in sophistication after being shown help content related to the more efficient route. Accordingly, the machine learning model may present help content to the user related to the efficient route, for example, within the form of help recommendation prompt 500.

In some embodiments, the machine learning model may additionally be used to determine a reasonable time to present said help content to the user. For example, the help recommendation prompt 500 may be presented to the user based on a prediction that the user will perform a certain action. Here, for example, the machine learning model may be trained to recognize action patterns of the user such that the model predicts that the user will perform the associated action using the less efficient route. Accordingly, the help recommendation prompt 500 can be submitted just before the user attempts the less efficient route to guide the user into the more efficient route. It should be understood that other means of presenting recommended help content to a user are also contemplated, as will be described in further detail below.

Figure 5B:
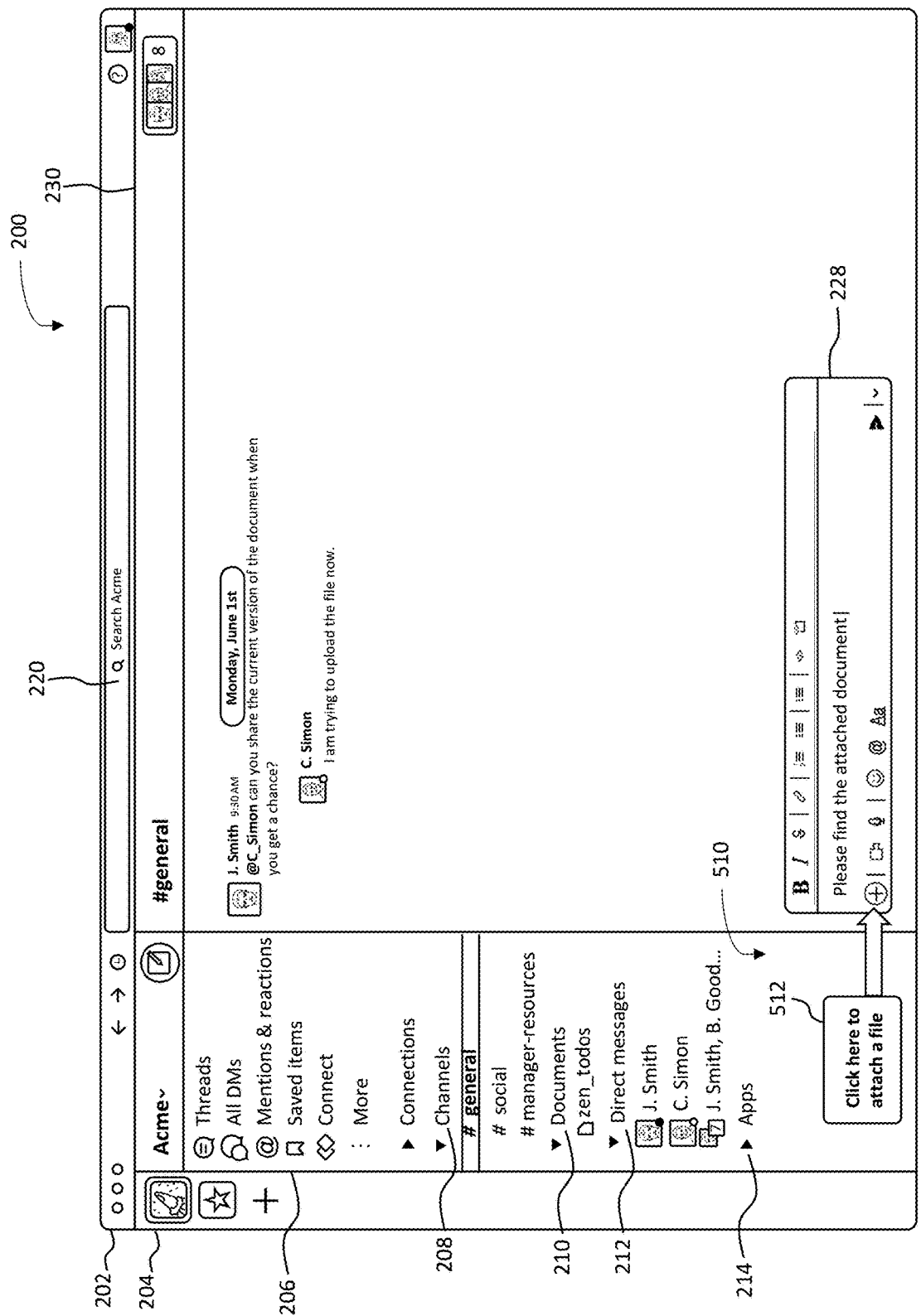
FIG. 5B illustrates an exemplary user interface relating to some embodiments.

FIG. 5B illustrates an exemplary user interface 200 including an interactive overlay 510 relating to some embodiments. In some embodiments, the interactive overlay 510 may be presented to the user as an interactive tour overlayed onto the user interface 200, as shown. The interactive tour may be included as a form of help content within the group-based communication system for familiarizing users with a particular feature or action. For example, an interactive tour including an interactive overlay 510 for assisting the user in uploading a file within the group-based communication system, as shown. In some embodiments, the interactive overlay 510 includes one or more instructions 512 configured to guide the user through the process of uploading a file within the group-based communication system.

It should be understood that other types of interactive tours are also contemplated for performing other actions and accessing other features of the group-based communication system. For example, interactive tours may be included for any of posting in a private or public channel, sending a direct message or multiple person direct message, reacting to a post, mentioning another user, reading messages using a native mobile application associated with the group-based communication system, using a synchronous multimedia collaboration session associated with the group-based communication system, using external collaboration features, accessing help content of the group-based communication system, or other actions associated with the group-based communication system.

Figure 6:
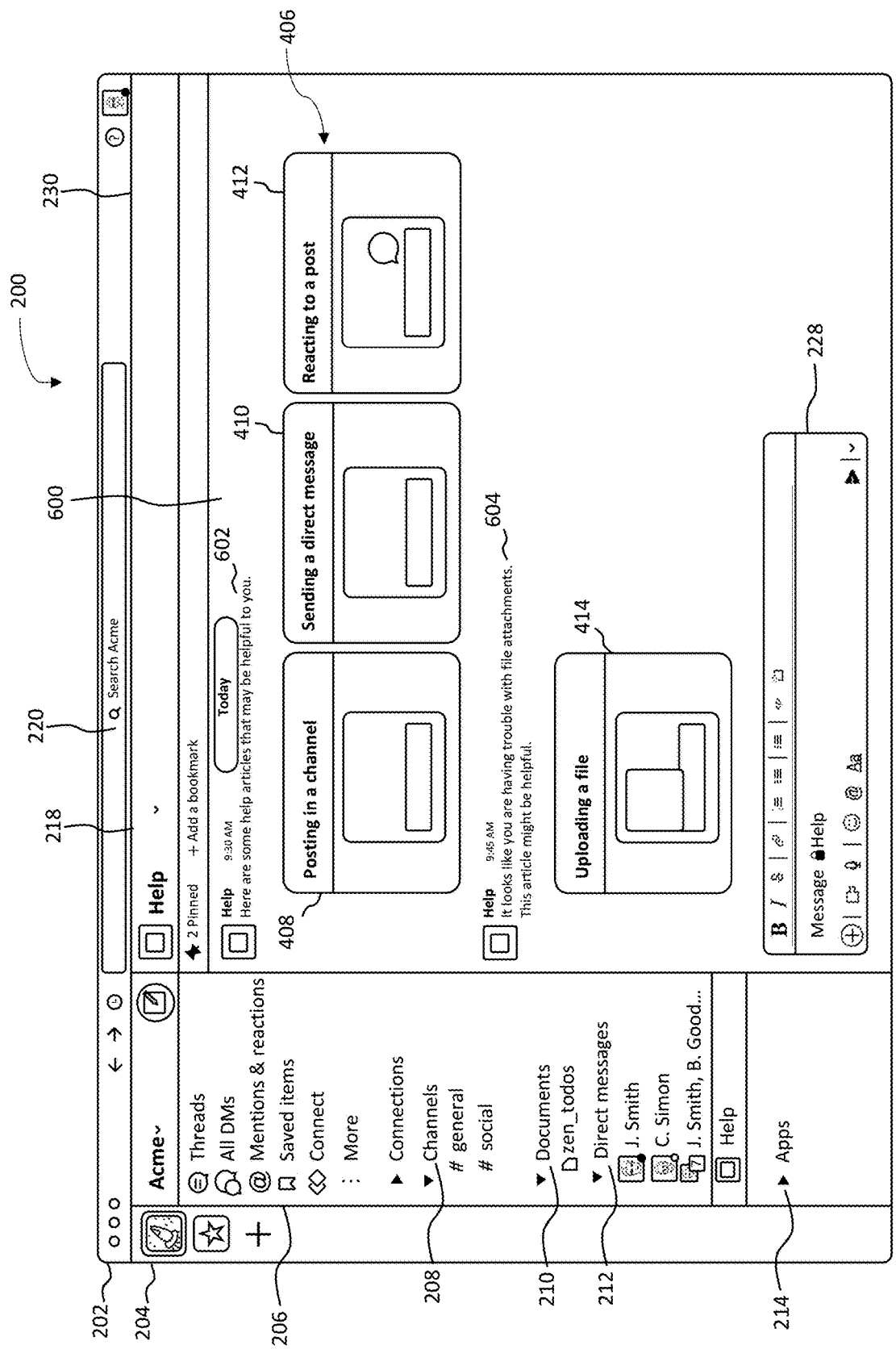
FIG. 6 illustrates an exemplary user interface relating to some embodiments.

FIG. 6 illustrates an exemplary user interface 200 relating to some embodiments. In some embodiments, recommended help content may be presented to the user via a help content channel 600, as shown. In some embodiments, a separate help content channel 600 may be generated and personalized for each user of the group-based communication system. In some embodiments, said help content channel 600 may be used for providing an environment for personalized help content to be recommended and presented to the user. For example, in some embodiments, the help content channel 600 may be associated with an automated help service of the group-based communication system. In some such embodiments, the help content channel 600 may be established as a direct message channel between the individual user and the automated help service.

In some embodiments, a list of recommended help content 406 may be sent to the user within the help content channel 600, as shown. For example, the list of recommended help content 406 may be included within a message 602 sent from the automated help service, as shown. In some embodiments, the list of recommended help content 406 may be personally curated for each individual user. For example, specific items of help content may be selected for the list of recommended help content 406 based on historical user data. In some embodiments, the items of recommended help content may be selected based on a determination that the user has not performed actions described in the recommended help content. Further, the items of recommended help content may be determined using the machine learning model, as described above. In some such embodiments, the machine learning model may receive a user sophistication score of the user as an input and determine relevant help content based on historical user engagement data. Accordingly, help content may be personalized for each individual user. Additionally, a most relevant order of help content may be determined.

In some embodiments, an additional message 604 may be sent to the user including an item of recommended help content responsive to one or more actions performed by the user. For example, the file upload help article 414 may be sent to the user within the additional message 604 based on a determination that the user is struggling to upload a file within the group-based communication system.

FIG. 7 illustrates an exemplary user data table 700 relating to some embodiments. In implementations, the corresponding user data table may be considerably larger, including tens, hundreds, or thousands of columns relating to more fine-grained actions within the group-based communication system, including any action possible for a user to perform within the group-based communication system. For example, in some embodiments, the user data table 700 may be representative of user data considered by the machine learning model in the selection of recommended help content. In some embodiments, the exemplary user data table 700 is representative of exemplary data stored in the training data store 304. Accordingly, embodiments are contemplated in which the contents of the user data table 700 may be used to train the machine learning model or to determine a user sophistication score. Further, in some embodiments, at least a portion of the data within the user data table 700 may be included within a multidimensional user sophistication score variable. For example, in some such embodiments, the user sophistication score variable may include an array of values relating to the user's sophistication with respect to a plurality of features of the group-based communication system.

In some embodiments, the user data table 700 includes data relating to a plurality of users such as, for example, a username 702, a number of messages sent 704, a number of reactions 706, a number of channels joined 708, an average number of messages sent per day 710, and a score 712 for each respective user. However, as described above, it should be understood that other forms and types of data are also contemplated. Furthermore, in some embodiments, entries may be binary values indicating whether the user has ever performed a given action, rather than a count of the times the user has performed the action.

In some embodiments, the score 712 is a user sophistication score used to represent an overall sophistication of the user indicative of the user's familiarity and skill in performing various actions within the group-based communication system. The score may represent a number or fraction of tasks that the user has successfully performed in the group-based communication system. Alternatively, the user sophistication score may represent a probability that a user will successfully complete a desired task. Alternatively, or additionally, in some embodiments, the user sophistication score may be multidimensional such that the sophistication score represents the user's sophistication independently for a number of actions. For example, the user sophistication score may include a table, array, or matrix of values with each entry representing the user's proficiency of performing a specific action within the group-based communication system. According to some aspects, the user sophistication score may be selected from a value between 0 and 100, where 100 may be assigned to someone who has demonstrated use of most or all of the features of a group-based communication system, while a 0 may be assigned to someone who has not yet used any features of the group-based communication system.

Figure 8:
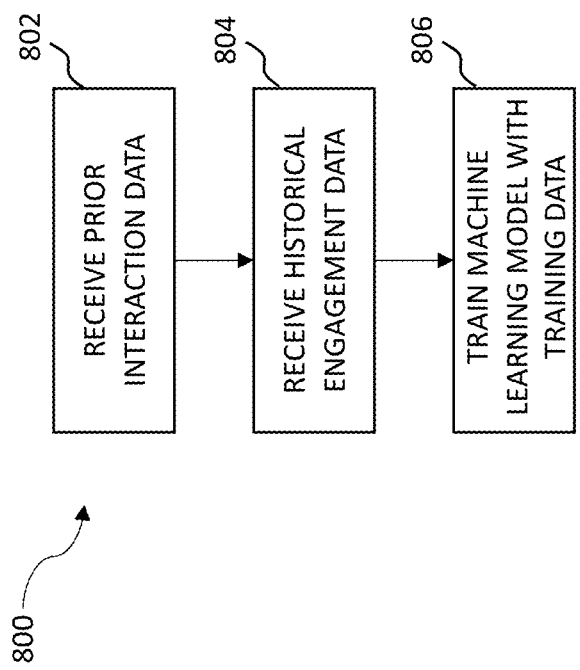
FIG. 8 illustrates an exemplary method of training a machine learning model relating to some embodiments.

FIG. 8 illustrates an exemplary method 800 of training a machine learning model relating to some embodiments. In some embodiments, any of the methods described herein may be performed by one or more processors. For example, in some embodiments, processing may be divided such that a first processor performs a first portion of steps while a second processor performs a second portion of steps.

At step 802, prior interaction data is received. In some embodiments, the prior interaction data may be received from a training data store 304 or from another data store or data structure associated with the group-based communication system. The prior interaction data may relate to a plurality of prior users and a plurality of features of the group-based communication system. For example, the prior interaction data may indicate user interaction with the plurality of features of the group-based communication system showing what users have performed various actions and interacted with various features of the group-based communication system.

At step 804, historical user engagement data may be received. In some embodiments, the historical user engagement data may be received from the training data store 304 or other data store associated with the group-based communication system. The historical user engagement data may relate to user engagement with help content associated with the plurality of features of the group-based communication system. For example, the historical user engagement data may include information indicating whether a particular user has consumed or accessed a help article relating to performing an action or using a feature of the group-based communication system.

At step 806, the machine learning model 302 is trained using training data. In some embodiments, the training data includes the prior user interaction data and the historical user engagement data received at steps 802 and 804, respectively. Accordingly, the machine learning model may be trained to learn relationships between the prior user interaction data and the historical user engagement data such that the machine learning model can use these relationships to generate a list of recommended help content for individual users of the group-based communication system based on individual user interaction data. Specific training techniques for various machine learning models are contemplated for the different types of machine learning models, as described above.

Figure 9A:
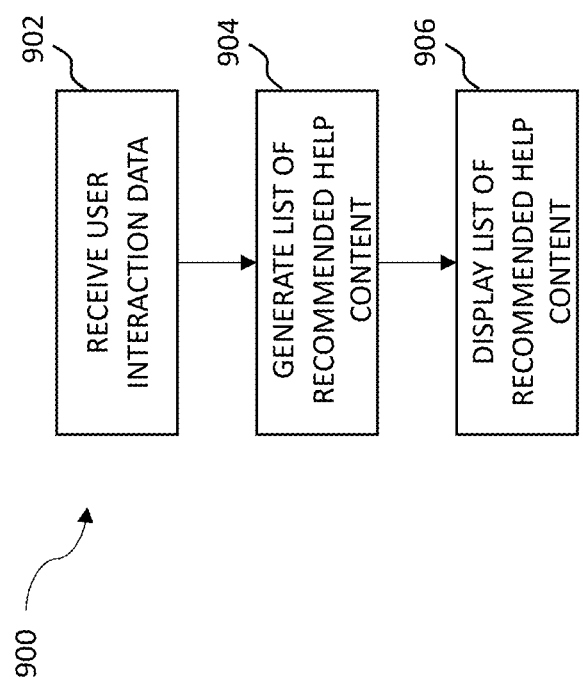
FIG. 9A illustrates an exemplary method of recommending help content relating to some embodiments.

FIG. 9A illustrates an exemplary method 900 of recommending help content relating to some embodiments. In some embodiments, the steps of the method 900 may be performed any number of times. For example, the method 900 may be repeated periodically to curate personalized help content for a number of users. Further, the recommended help content may be updated based on subsequently received information.

At step 902, user interaction data is received. In some embodiments, the user interaction data comprises prior interactions of an individual user with one or more features of the group-based communication system. In some embodiments, the user interaction data may be stored within a data store associated with the group-based communication system. Further, in some embodiments, the user interaction data may be stored in or represented in by a user sophistication metric or user sophistication score. For example, in some embodiments, the user sophistication score may indicate a user's sophistication level in interacting with various features of the group-based communication system. The user sophistication score may include a multidimensional variable or array of data including a plurality of entries corresponding to a respective plurality of features of the group-based communication system. For example, in some embodiments, the user sophistication score may include at least a portion of the data of the user data table 700, as shown in FIG. 7.

In some embodiments, the user interaction data comprises application programing interface (API) interaction data including indicia of one or more API interactions of the user associated with the group-based communication system. Here, the API interaction data may indicate which APIs the user has interacted with. Accordingly, embodiments are contemplated in which the user sophistication score may be determined based at least in part on the API interaction data. Additionally, or alternatively, in some embodiments, the user interaction data may include data indicating a failure of a user to interact with a particular feature of the group-based communication system. For example, the user interaction data may include an indication that the user has never sent a message to a channel of the group-based communication system. A failure of a user to interact with a feature could indicate a lack of familiarity or understanding of the feature. Thus, presenting curated help content to the user identifying the feature, and how to use it, may result in the user increasing interaction with the feature, and accordingly, an improved user experienced resulting in increased interactions with the group-based communication system as a whole.

At step 904, a list of recommended help content may be generated. In some embodiments, the list of recommended help content may be generated at least in part by using the machine learning model 302. For example, the machine learning model 302 may generate the list of recommended help content based at least in part on the user interaction data received at step 902. In some embodiments, the machine learning model 302 may receive the user interaction data as an input and then generate the list of recommended help content as an output. In some such embodiments, the user interaction data may be input as a user sophistication score.

At step 906, the list of recommended help content may be displayed within a user interface associated with the group-based communication system. In some embodiments, the list of recommended help content may include any number of items of help content. The specific items and order of items within the list of recommended help content may be selected by the machine learning model for each individual user based at least in part on the user interaction data or the user sophistication score of the user.

Figure 9B:
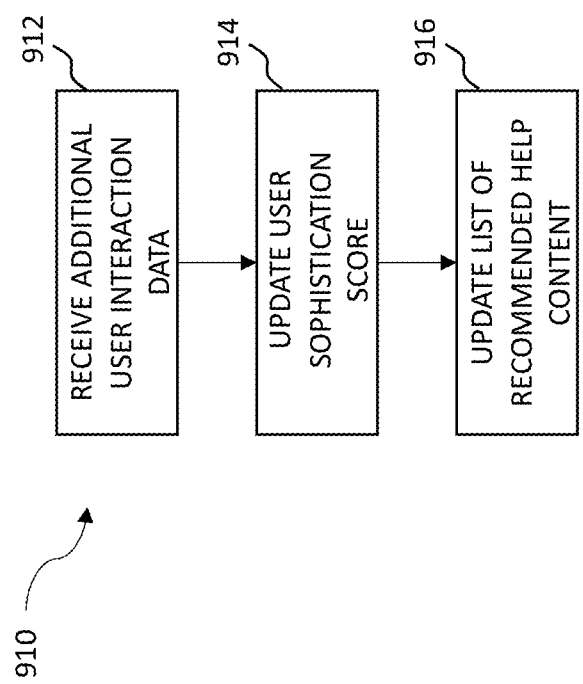
FIG. 9B illustrates an exemplary method of updating a list of recommended help content relating to some embodiments.

FIG. 9B illustrates an exemplary method 910 of updating a list of recommended help content relating to some embodiments. In some embodiments, the method 910 may be performed during or after execution of the method 900. For example, an initial list of recommended help content may be generated and then updated based on subsequently received user interaction data.

At step 912, additional user interaction data is received. In some embodiments, the additional user interaction data may be received after an initial user sophistication score has already been received. In some embodiments, the additional user interaction data may be indicative of the user performing an action or interacting with a feature of the group-based communication system.

At step 914, the user sophistication score is updated. Here, the user sophistication score may be updated based at least in part on the additional user interaction data received at step 912. In some embodiments, where the user sophistication is a multidimensional variable one or more entries of the user sophistication score are updated. Alternatively, or additionally, in some embodiments, the user sophistication score is a single-dimensional variable such that the user sophistication score is updated by recalculating the user sophistication score based on the additional user interaction data.

At step 916, the list of recommended help content is updated based on the updated sophistication score. In some such embodiments, the list of recommended help content may be updated by any of adding an item of help content, removing an item of help content, or changing an order of items of help content in the list of recommended help content. In some embodiments, the list of recommended help content may be updated upon receipt of the updated user sophistication score.

In one example, the additional user interaction data at step 912 relates to a user posting a message in a channel of the group-based communication system. Accordingly, the user sophistication score may be updated at step 914 based on confirming that the user has posted a message in the channel. At step 916, the list of recommended help content may be updated by removing an item of help content relating to the additional user interaction data, such as, an article describing how to post a message in a channel of the group-based communication system, from the list of recommended help content.

Having thus described various embodiments of the present disclosure, what is claimed as new and desired to be protected by Letters Patent includes the following:

1. A method of recommending help content within a group-based communication system, the method comprising:

receiving user interaction data comprising prior interactions of a user with one or more features of a plurality of features of the group-based communication system;

generating, using a trained machine learning model, a list of recommended help content based on the user interaction data, wherein the trained machine learning model is trained based on:

a first set of data that includes prior interaction data for a plurality of prior users and the plurality of features of the group-based communication system, and a second set of data that includes historical user engagement data including engagement with the help content associated with the plurality of features, to learn relationships between the first set of data and the second set of data, such that the trained machine learning model is configured to use the relationships to generate the list of recommended help content for the user upon input of the user interaction data of the user;

displaying, via a graphical user interface, the list of recommended help content;

determining a user sophistication score of the user based on the user interaction data;

receiving an indication of an action performed by the user within the group-based communication system;

updating the user sophistication score of the user based on the action performed by the user; and updating, using the trained machine learning model, the list of recommended help content based on the user sophistication score, wherein:

the list of recommended help content comprises a plurality of help articles, and an order of the plurality of help articles is updated upon receipt of an updated user sophistication score.

2. The method of claim 1, wherein the list of recommended help content comprises at least one interactive tour configured to generate an overlay within the graphical user interface guiding the user through performing one or more actions within the group-based communication system.

3. The method of claim 1, further comprising:

determining that the user has not interacted with a feature of the plurality of features of the group-based communication system based on the user interaction data; and responsive to determining that the user has not interacted with the feature of the plurality of features of the group-based communication system, adding an item of the help content associated with the feature of the plurality of features of the group-based communication system to the list of recommended help content.

4. The method of claim 1, wherein the user interaction data further comprises application programming interface (API) interaction data including indicia of one or more API interactions of the user associated with the group-based communication system.

5. The method of claim 1, wherein the user interaction data includes data indicating a failure of the user to interact with one of the one or more features of the group-based communication system.

6. The method of claim 1, further comprising at least one of updating or reordering the list of recommended help content based on interactions of the user, subsequent to the prior interactions, with individual features of the plurality of features.

7. The method of claim 1, further comprising:

determining a time at which the user is predicted to perform a second action relating to a feature of the plurality of features that is associated with the list of recommended help content; and displaying, at or prior to the time and via the graphical user interface, the list of recommended help content.

8. The method of claim 1, further comprising determining, based on the user interaction data, a second action associated with a feature of the plurality of features that the user has initiated but that has yet to perform, wherein the list of recommended help content includes second help content related to the second action.

9. The method of claim 1, further comprising determining, based at least in part on the user interaction data, a type of help content previously utilized by the user in successful performance of a second action associated with a feature of the plurality of features, wherein the list of recommended help content includes help content of the type.

10. One or more non-transitory computer-readable media storing computer-executable instructions that, when executed by at least one processor, perform a method of recommending help content within a group-based communication system, the method comprising:

receiving user interaction data comprising prior interactions of a user with one or more features of a plurality of features of the group-based communication system;

generating, using a trained machine learning model, a list of recommended help content based on the user interaction data wherein the trained machine learning model is trained based on:

a first set of data that includes prior interaction data for a plurality of prior users and the plurality of features of the group-based communication system, and a second set of data that includes historical user engagement data including engagement with the help content associated with the plurality of features, to learn relationships between the first set of data and the second set of data, such that the trained machine learning model is configured to use the relationships to generate the list of recommended help content for the user upon input of the user interaction data of the user;

determining a time at which the user is predicted to perform an action relating to a feature of the plurality of features that is associated with the list of recommended help content; and displaying, at or prior to the time and via a graphical user interface, the list of recommended help content.

11. The one or more non-transitory computer-readable media of claim 10, wherein the list of recommended help content comprises at least one interactive tour configured to generate an overlay within the graphical user interface guiding the user through performing one or more actions within the group-based communication system.

12. The one or more non-transitory computer-readable media of claim 10, the method further comprising:

determining that the user has not interacted with a second feature of the plurality of features of the group-based communication system based on the user interaction data; and responsive to determining that the user has not interacted with the second feature of the plurality of features of the group-based communication system, adding an item of the help content associated with the second feature of the plurality of features of the group-based communication system to the list of recommended help content.

13. The one or more non-transitory computer-readable media of claim 10, the method further comprising determining a user sophistication score of the user based on the user interaction data, wherein the list of recommended help content comprises a plurality of help articles and wherein an order of the plurality of help articles is updated upon receipt of an updated user sophistication score.

14. The one or more non-transitory computer-readable media of claim 13, further comprising:
- receiving an indication of a second action performed by the user within the group-based communication system;
- updating the user sophistication score of the user based on the second action performed by the user; and
- updating, using the trained machine learning model, the list of recommended help content based on the user sophistication score.

15. The one or more non-transitory computer-readable media of claim 10, wherein the user interaction data further comprises application programming interface (API) interaction data including indicia of one or more API interactions of the user associated with the group-based communication system.

16. The one or more non-transitory computer-readable media of claim 10, wherein the user interaction data includes data indicating a failure of the user to interact with one of the one or more features of the group-based communication system.

17. A system comprising:
- at least one processor; and
- one or more non-transitory computer-readable media storing computer-executable instructions that, when executed by the at least one processor, perform a method of recommending help content within a group-based communication system, the method comprising:
  - receiving user interaction data comprising prior interactions of a user with one or more features of a plurality of features of the group-based communication system;
  - generating, using a trained machine learning model, a list of recommended help content based on the user interaction data,
  - wherein the trained machine learning model is trained based on:
    - a first set of data that includes prior interaction data for a plurality of prior users and the plurality of features of the group-based communication system, and
    - a second set of data that includes historical user engagement data including engagement with the help content associated with the plurality of features, to learn relationships between the first set of data and the second set of data, such that the trained machine learning model is configured to use the relationships to generate the list of recommended help content for the user upon input of the user interaction data of the user; displaying, via a graphical user interface, the list of recommended help content; and
  - determining, based at least in part on the user interaction data, an action associated with a feature of the plurality of features that the user has initiated but that has yet to perform, wherein the list of recommended help content includes second help content related to the action.

18. The system of claim 17, the method further comprising:
- determining that the user has not interacted with a second feature of the plurality of features of the group-based communication system based on the user interaction data; and
- responsive to determining that the user has not interacted with the second feature of the plurality of features of the group-based communication system, adding an item of the help content associated with the second feature of the plurality of features of the group-based communication system to the list of recommended help content.

19. The system of claim 17, the method further comprising determining a user sophistication score of the user based on the user interaction data.

20. The system of claim 17, wherein the user interaction data further comprises application programming interface (API) interaction data including indicia of one or more API interactions of the user associated with the group-based communication system.

* * * * *